United States Patent
Pedersen et al.

(10) Patent No.: US 9,831,988 B2
(45) Date of Patent: Nov. 28, 2017

(54) METHOD OF EXCHANGING DATA PACKAGES BETWEEN FIRST AND SECOND PORTABLE COMMUNICATION DEVICES

(71) Applicant: GN Hearing A/S, Ballerup (DK)

(72) Inventors: Brian Dam Pedersen, Ringsted (DK); Klaus Hagen Jensen, Kobenhavn S (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 14/835,562

(22) Filed: Aug. 25, 2015

(65) Prior Publication Data

US 2017/0054528 A1    Feb. 23, 2017

(30) Foreign Application Priority Data

Aug. 18, 2015    (DK) .................................. 2015 70538
Aug. 18, 2015    (EP) ..................................... 15181384

(51) Int. Cl.
*H04L 1/18*    (2006.01)
*H04L 1/08*    (2006.01)
(Continued)

(52) U.S. Cl.
CPC .............. *H04L 1/08* (2013.01); *H04B 1/385* (2013.01); *H04L 1/1607* (2013.01); *H04L 65/60* (2013.01); *H04W 76/023* (2013.01); *H04W 88/02* (2013.01)

(58) Field of Classification Search
CPC ... H04W 4/008; H04W 74/085; H04W 84/18; H04W 72/06; H04H 20/88; H04R 25/554;
(Continued)

(56) References Cited

U.S. PATENT DOCUMENTS 4,864,588 A  *  9/1989  Simpson  .............  H02J 13/0075
                                                    375/365
6,400,751 B1    6/2002  Rodgers
(Continued)

FOREIGN PATENT DOCUMENTS

EP    1 220 499 A2    7/2002
EP    2 897 384 A2    7/2015
(Continued)

OTHER PUBLICATIONS

First Technical Examination and Search Report dated Nov. 26, 2015 for corresponding Danish Patent Application No. PA 2015 70538, 6 pages.
(Continued)

*Primary Examiner* — Guerrier Merant
(74) *Attorney, Agent, or Firm* — Vista IP Law Group, LLP

(57) ABSTRACT

The present disclosure relates to a method of exchanging data packages between first and second portable communication devices over a bi-directional wireless communication channel. The method includes generating, by the first portable communication device, a first data package belonging to a first packet category comprising audio data or to a second packet category without audio data and transmitting the first data package from the first portable communication device to the second portable communication device through the wireless communication channel. Where an acknowledgement indicator of the second data package is unset or the second data package is absent, the first portable communication device retransmits the first data package from the first to the second portable communication device for at the most N times if the first data package belongs to the first packet category; N being a positive integer between 1 and 4.

16 Claims, 8 Drawing Sheets

(51) Int. Cl.
*H04L 29/06* (2006.01)
*H04B 1/3827* (2015.01)
*H04L 1/16* (2006.01)
*H04W 76/02* (2009.01)
*H04W 88/02* (2009.01)

(58) Field of Classification Search
CPC ............... H04R 25/558; H04R 25/552; H04R 2227/003; H04R 2420/07; H04R 2225/55; H04L 1/188; H04L 1/1803; H04L 1/1664; H04L 1/1671; H04B 1/385
See application file for complete search history.

(56) References Cited

U.S. PATENT DOCUMENTS

| | | |
|---|---|---|
| 2002/0191678 A1 | 12/2002 | Batra et al. |
| 2002/0193072 A1* | 12/2002 | Alinikula ............ H04L 1/1664 455/41.1 |
| 2003/0081603 A1 | 5/2003 | Rune |
| 2005/0005227 A1 | 1/2005 | Felbecker et al. |
| 2005/0089183 A1 | 4/2005 | Niederdrank et al. |
| 2005/0255843 A1* | 11/2005 | Hilpisch ............ H04R 25/554 455/425 |
| 2005/0281277 A1 | 12/2005 | Killian |
| 2006/0041675 A1 | 2/2006 | Sturrock et al. |
| 2006/0046659 A1 | 3/2006 | Haartsen et al. |
| 2006/0068842 A1 | 3/2006 | Sanguino |
| 2006/0133543 A1 | 6/2006 | Linsky et al. |
| 2006/0227741 A1 | 10/2006 | Lappetelainen |
| 2006/0274747 A1* | 12/2006 | Duchscher ............ H04L 1/0057 370/389 |
| 2007/0049983 A1 | 3/2007 | Freeberg |
| 2007/0165754 A1 | 7/2007 | Kiukkonen et al. |
| 2007/0291797 A1 | 12/2007 | Rao |
| 2007/0297435 A1 | 12/2007 | Bucknell et al. |
| 2008/0031478 A1 | 2/2008 | Alber et al. |
| 2008/0298450 A1 | 12/2008 | Zhang |
| 2009/0111496 A1 | 4/2009 | Ibrahim |
| 2009/0268807 A1 | 10/2009 | Krishnaswamy |
| 2010/0054512 A1 | 3/2010 | Solum |
| 2010/0158292 A1 | 6/2010 | Pedersen |
| 2011/0150252 A1 | 6/2011 | Solum et al. |
| 2012/0058727 A1 | 3/2012 | Cook et al. |
| 2012/0087505 A1 | 4/2012 | Popovski et al. |
| 2013/0102251 A1 | 4/2013 | Linde et al. |
| 2013/0279727 A1 | 10/2013 | Liu et al. |
| 2014/0341406 A1 | 11/2014 | Gudiksen |
| 2014/0348327 A1* | 11/2014 | Linde .................... H04W 4/008 381/2 |
| 2015/0004913 A1 | 1/2015 | Linde et al. |
| 2015/0098420 A1 | 4/2015 | Luo et al. |
| 2015/0215214 A1 | 7/2015 | Ng |
| 2015/0334488 A1 | 11/2015 | Kim |
| 2015/0364143 A1 | 12/2015 | Abildgren |
| 2017/0054763 A1 | 2/2017 | Pedersen et al. |
| 2017/0055089 A1 | 2/2017 | Pedersen et al. |

FOREIGN PATENT DOCUMENTS

| | | |
|---|---|---|
| EP | 2 943 026 A1 | 11/2015 |
| GB | 2 344 029 A | 5/2000 |
| JP | 2005-311931 A | 11/2005 |

OTHER PUBLICATIONS

Extended European Search Report dated Mar. 22, 2016 for corresponding EP Patent Application No. 15181384.7, 7 pages.
First Technical Examination and Search Report dated Nov. 18, 2015 for related Danish Patent Application No. PA 2015 70536, 7 pages.
Non-final Office Action dated Feb. 1, 2017 for related U.S. Appl. No. 14/835,584.
First Technical Examination and Search Report dated Dec. 1, 2015 for related Danish Patent Application No. PA 2015 70537, 8 pages.
Extended European Search Report dated Jun. 9, 2016 for related EP Patent Application No. 15181383.9, 14 pages.
Naresh Gupta, Inside Bluetooth Low Energy, Bluetooth Lower Layers, Jan. 1, 2013, Artech House, Boston—London, pp. 33-44.
Non-final Office Action dated Oct. 27, 2016 for related U.S. Appl. No. 14/835,527.
Extended European Search Report dated Feb. 4, 2016 for related EP Patent Application No. 15181382.1, 8 pages.
International Search Report and Written Opinion dated Dec. 28, 2011 for related PCT Patent Application No. PCT/EP2011/067989.
Luca Stabellini et al., "A new probailistic approach for adaptive frequency hopping" IEEE 20th International Symposium on Personal, Indoor and Mobile Radio Communications, Sep. 13, 2009, 6 pages.
Japanese Notice of Reasons for Rejection (non-final office action) dated Apr. 1, 2014 for related JP Patent Application No. 2013-533231, 2 pages.
Non-final Office Action dated Feb. 9, 2015 for related U.S. Appl. No. 13/825,966.
Final Office Action dated Sep. 21, 2015 for related U.S. Appl. No. 13/825,966.
Non-final Office Action dated Jun. 8, 2016 for related U.S. Appl. No. 13/825,966.
Final Office Action dated Dec. 30, 2016 for related U.S. Appl. No. 13/825,966.
Non-final Office Action dated May 22, 2017 for related U.S. Appl. No. 14/835,527.
Notice of Allowance and Fee(s) due dated Jun. 14, 2017 for related U.S. Appl. No. 13/825,966.
Notice of Allowance and Fee(s) due dated Jul. 13, 2017 for related U.S. Appl. No. 14/835,584.

* cited by examiner

METHOD OF EXCHANGING DATA PACKAGES BETWEEN FIRST AND SECOND PORTABLE COMMUNICATION DEVICES

RELATED APPLICATION DATA

This application claims priority to and the benefit of Danish Patent Application No. PA 2015 70538 filed on Aug. 18, 2015, pending, and European Patent Application No. 15181384.7 filed on Aug. 18, 2015, pending. The entire disclosures of the above applications are expressly incorporated by reference herein.

FIELD

The present disclosure relates in a first aspect to a method of exchanging data packages between a first portable communication device and a second portable communication device over a bi-directional wireless communication channel, where at least one of the first and second portable communication devices comprises a hearing instrument. The method comprises steps of generating, by the first portable communication device, a first data package belonging to a first packet category comprising audio data or to a second packet category without audio data and transmitting the first data package from the first portable communication device to the second portable communication device through the wireless communication channel. The method comprises further steps of monitoring the wireless communication channel for a second data package transmitted by the second portable communication device subsequent to receipt of the first data package. Where an acknowledgement indicator of the second data package is unset or the second data package is absent, the first portable communication device retransmits the first data package from the first to the second portable communication device for at the most N times if the first data package belongs to the first packet category; N being a positive integer between 1 and 4.

BACKGROUND

Wireless bi-directional or unidirectional streaming of audio data between a pair of hearing instruments, or a hearing instrument and another portable communication device, is highly desirable. There exists, however, a number of technical problems in terms of power consumption, reliability, transmission latency or delay, component size etc. with prior art wireless data communication methodologies, protocols and devices that must be addressed to deliver a feasible solution for a hearing instrument due to the small amount of power available from typical batteries of hearing instruments.

Standardized wireless data communication protocols such as Bluetooth LE as defined by the Bluetooth Core Specification 4.1, or earlier versions, does not allow for real-time audio transport. There are a number of limitations in the protocol as defined that means that real-time audio transport is unfeasible without changing certain protocol layers:

- The nature of the L2CAP channels as defined for LE— where a best effort approach for data transport with no timeouts or flushes on transmissions is defined—also means that it is next to impossible to do a real-time audio service over LE as defined.
- The lack of real-time transport means also means that stereo synchronization between two paired audio sinks (such as hearing aids) is next to impossible.
- The packet size means that the overhead data for transmitting the required data rate for real-time audio (typically 16-96 kbit/s) is very high.

It is an object of the present method of exchanging data packages between the first and second portable communication devices to overcome the above-mentioned problems and shortcomings of the prior art wireless data communication methodologies, protocols and devices.

SUMMARY

A first aspect of one or more embodiments described herein relates to a method of exchanging data packages between a first portable communication device and a second portable communication device over a bi-directional wireless communication channel, where at least one of the first and second portable communication devices comprises a hearing instrument; said method comprising steps of:

generating, by the first portable communication device, a first data package belonging to a first packet category comprising audio data or to a second packet category without audio data, and adding an acknowledgement indicator with a default setting to the first data package, transmitting the first data package from the first portable communication device to the second portable communication device through the wireless communication channel, monitoring the wireless communication channel for a second data package belonging the first or second packet category transmitted by the second portable communication device subsequent to receipt of the first data package, receiving the second data package at the first portable communication device, and if an acknowledgement indicator of the second data package is set:

generating, at the first portable communication device, a third data package comprising an acknowledgment indicator setting reflecting successful or failed receipt of the second data package, and transmitting the third data package to the second portable communication device through the wireless communication channel; or if the acknowledgement indicator of the second data package is unset or the second data package is absent:

setting the acknowledgment indicator of the first data package to reflect failed receipt of the second data package and retransmitting the first data package from the first to the second portable communication device, wherein the retransmission of the first data package is carried out for at the most N times if the first data package belongs to the first packet category; N being a positive integer between 1 and 4.

On the other hand, if the first data package belongs to the second packet category and the second data package is absent or the acknowledgement indicator of the second data package is unset or data of the second package are flagged as invalid, the first portable communication device may be configured to flushing or deleting the first data package as discussed below in further detail.

At least some of the data packages generated and transmitted by the first portable communication device comprise audio data or audio frames and these data packages therefore belongs to the first packet category. The first portable communication device may comprise the hearing instrument discussed above. On the other hand, the data packages generated and transmitted by the second portable communication device such as the second data package may lack audio data and solely include various types of control data for the aligning or synchronizing the operation of the first and second portable communication device as discussed in further detail below. Alternatively, at least some of the data packages generated and transmitted by the first portable communication device and at least some of the data packages generated and transmitted by the second portable communication device comprise audio data or audio frames.

Each of the first, second and third data packages may comprise an error detection code, such as CRC as discussed below in further detail, to allow the first and second portable communication device to check the validity of the data of a received data package before utilizing the data of the data package in question. If the error detection code indicates that data of the received data package are invalid, the data, in particular the acknowledgment indicator, may be ignored and the acknowledgment indicator of a subsequently transmitted data package set to reflect failed receipt of the received data package. Hence, the method of exchanging data packages may comprise further steps of:

checking an error-detection code of the second data package subsequent to receipt of the second data package at the first portable communication device, if the error-detection code indicates invalid data of the second data package: ignoring the setting of the acknowledgment indicator of the second data package and unset the acknowledgment indicator of the third data package to reflect failed receipt of the second data package. The third data package may belong to the second packet category.

The audio data may comprise a plurality of samples or values of a digital audio signal, such as a sequence of discrete-time and discrete-amplitude digital audio signal values that represent continuous-time and continuous-amplitude values of an analogue audio signal that can be converted into acoustic sound. In other words, the audio data and frames contain encoded digital data that are intended for conversion into sound at some point in time as is well-known in the art of streaming audio.

In the first embodiment of the present methodology, both the first portable communication device and the second portable communication device comprise a hearing instrument or hearing aid for example jointly forming a wireless binaural hearing aid system. In the latter embodiment, each of the first and second hearing aids may receive and deliver a binaurally processed hearing loss compensated audio signal to a user or patient via respective loudspeakers or receivers as discussed in further detail below with reference to the appended drawings. Each of the first and second hearing instruments or aids may comprise a BTE, RIE, ITE, ITC, CIC, etc. type of hearing instrument. Typically, only a severely limited amount of power is available from a power supply of a hearing instrument. For example, power is typically supplied from a conventional $ZnO_2$ battery in a hearing aid. In the design of a hearing aid, the size and the power consumption are important considerations.

In other embodiments of the present methodology, one of the first and second portable communication devices comprises a battery powered audio-enabled device such as an earphone, headset, smartphone, remote microphone array, remote signal processor etc.

The present methodology of exchanging data packages is based on a limited number of retransmission of lost data packages of the first packet category. A data package of the first packet category comprises audio data or frames which for example may be held or stored in a payload section of the data package as discussed in further detail below with reference to the appended drawings. Other data packages generated and transmitted by the first portable communication device, such as the third data package, may belong to the second packet category without audio data. Data packages belonging to the second packet category are preferably not retransmitted if the first transmission attempt by the first or second portable communication device fails because data of this packet category typically lack urgency (e.g. not real-time critical) or may be uncritical to the proper operation of the first or second portable communication device. Hence, the data packages belonging to the second packet category may be discarded or flushed after a failed first transmission attempt. In the alternative, a failed first transmission attempt of a data package belonging to the second packet category may lead to a retransmission attempt of the data content, for example a payload section, of the data package in question, at a later time instant. This later time instant may be during a later so-called connection event in embodiments where the first and second portable communication devices are physically connected during a plurality of successive connection events over time as discussed in further detail below. The default setting of the acknowledgement indicator of the first data package is optional since there is no previous data package to the first data package, for example the first data package of each connection event. However, to keep a coherent layout of the first, second, third data packages, it may be desirable to include the acknowledgement indicator in the first data package and just ignore its setting in the second portable communication device.

The maximum number of retransmission of a data package of the first packet category is limited to either the positive integer N or the positive integer M depending on the communication device in question. Each of M and N is preferably at least 1 and at the most 4. Hence, the first data package may be retransmitted one, two, three or four times and the second data package may be retransmitted one, two, three or four times where the second data package belongs to the first packet category. In some embodiments of the present methodology, N may be equal to M. A data package of the first packet category is accordingly transmitted at the most N+1 times or M+1 times, i.e. a failed first transmission attempt followed by at the most N or M retransmission attempts. In this manner after each retransmission attempt of the first data package in response to a preceding failed transmission or retransmission attempt, the first portable communication device is monitoring the wireless communication channel for the second data package or a third data package transmitted by the second portable communication device for the purpose of finding express receipt acknowledgement of the first data package. The third data package may belong to the second packet category for the reasons discussed below. The first portable communication device therefore checks the setting of the acknowledgement indicator of the received second data package and if the acknowledgement indicator is unset or if the second data package is absent at an expected arrival time, the first portable communication device concludes that the retransmission attempt in question of the first data package was a failure and proceeds by making a further retransmission attempt of the first data package unless the maximum number N of retransmissions has been reached. If N retransmissions have been reached, the first portable communication device preferably proceeds to flush or abandon the first data package since N failed retransmissions have now been carried out. Alternatively, if the N retransmissions have not been reached, the first portable communication device reverts to making a further retransmission attempt of the first data package and thereafter proceeds to monitoring the wireless communication channel as described above awaiting an acknowledgment indicator of the second or third data package. Finally, if the acknowledgement indicator of the second or third data package is set, the first portable communication device concludes that the retransmission attempt in question of the first data package was successful and interrupts any further retransmission attempts. In the latter situation, the first portable communication device may proceed by switching certain wireless communication circuitry and functions to a power down mode as discussed in further detail below with reference to the appended drawings. The flushing or deletion of data packages belonging to the first packet category after N failed retransmissions is helpful to reduce latency or time delay of a received audio stream compiled from multiple received data packages of the first packet category either at the first or at second portable communication device. The flushing of the failed data package allows the portable communication device in question to add a more up-to-date or current audio frame to the new data package transmitted after the flushed data package. This flushing procedure in respect of lost data packages with audio data avoids that audio transmission through the wireless bi-directional communication channel is blocked or hung by a large number, in principle an infinite number, of retransmission attempts of a particular audio data package.

The present methodology may accordingly comprise further steps of:

if the transmission and N retransmissions of the first data package failed:

flush or discard the first data package and generate a fourth data package of the first packet category, transmitting the fourth data package from the first to the second portable communication device through the wireless communication channel; and/or if the transmission and M retransmissions of a second data package of the first packet category failed:

flush the second data package and generate a fourth data package of the first packet category, transmitting the fourth data package from the second to the first portable communication device through the wireless communication channel.

The skilled person will understand that the second portable communication device involved in the present methodologies of exchanging data packages between the first and second portable communication devices may operate in a corresponding manner to the first portable communication device with respect to receipt, processing, transmission and retransmission of data packages of the first packet category and data packages of the second packet category. Hence, one embodiment of the present methodology comprises further steps of:

monitoring, at the second portable communication device, the bi-directional wireless communication channel for the first data package transmitted by the first portable communication device, receiving the first data package at the second portable communication device, and generating, by the second portable communication device, the second data package with the acknowledgment indicator setting reflecting successful or failed receipt of the first data package, transmitting the second data package from the second to the first portable communication device through the bi-directional wireless communication channel, monitoring, at the second portable communication device, the bi-directional wireless communication channel for the third data package or the retransmitted first data package from the first portable communication device subsequently to receipt of the second data package, receiving the first data package or the third data package at the second portable communication device, and if the acknowledgement indicator of the first or the third data package is set:

discard further transmission of the second data package; or if the acknowledgement indicator of the first or the third data package is unset or the first or the third data package both absent:

retransmitting the second data package from the second to the first portable communication device for at the most M times if the second data package belongs to the first packet category; M being a positive integer number between 1 and 4.

One embodiment of the methodology of exchanging data packages may comprise further steps of:

establishing a plurality of successive connection events over time through the wireless communication channel, transmitting at least the first data package, the second data package and the third data package during a at least one connection event, or a subset of connection events, of the plurality of successive connection events. The skilled person will understand that a first data package, a second data package and a third data package may be transmitted during each of the successive connection events or at least during a majority of the successive connection events. If the transmission and N retransmissions of the first data package fail in a current connection event as discussed above, the fourth data package discussed above may be the first data package of a subsequent connection event. Likewise, if the second data package belongs to the first packet category and the first transmission and M retransmissions of the second data package fail in a current connection event as discussed above, the fourth data package discussed above may be the second data package of the subsequent connection event. The first and second portable communication devices are physically connected during each of the plurality of successive connection events and may be physically disconnected during intervening idle time periods. Hence, the plurality of consecutive connection events may be separated by intervening disconnect or idle time periods without data package exchange between the first and second portable communication devices. Hence, each pair of successive connection events may be separated by a disconnect period or idle time period. The time separation, or transmission interval, between a pair of adjacent connection events may lie between 2 ms and 20 ms such as between 5 ms and 10 ms. The time separation, or transmission interval, may be fixed as long as the first and second portable communication devices are logically connected despite the physical disconnection during the idle time periods. The durations of the successive connection events will generally vary depending on the required number of retransmissions of the first and/or second data packages in any particular connection event, the channel data rate and a size or length of the data packages. The duration of each of the successive connection events may for example lie between 0.5 ms and 5 ms such as between 0.9 ms and 2.5 ms as discussed in further detail below with reference to the appended drawings.

The method of exchanging data packages may comprise further steps of:

powering down respective transceiver circuits of the first and second portable communication devices during the disconnect time periods. This powering down or idling of the respective transceiver circuits may lead to considerable power consumption savings in each of the first and second portable communication devices as discussed in further detail below with reference to the appended drawings.

If the methodology comprises the plurality of successive connection events discussed above, the methodology may further comprise retransmitting the first data package for at the most N times during the at least one connection event if the first data package belongs to the first packet category; and/or retransmitting the second data package for at the most M times during the at least one connection event if the second data package belongs to the first packet category. Hence, if the first transmission and the N retransmissions of the first data package failed in a particular or current connection event, the first data package is flushed and a new data package holding audio data, i.e. belonging to the first packet category, is generated and transmitted by the first portable communication device in a subsequent connection event. This subsequent connection event may be a connection event following immediately after the current connection event with the multiple failed transmission attempts. The second portable communication device may apply the same procedure in respect of the first transmission and the M retransmissions of the second data package in a particular connection event. Hence, during some connection events where the first transmission and the N retransmissions of the first data package all failed, the third data package may not be transmitted because the first portable communication device utilizes all available package transmission attempts for retransmission of the first data package as discussed in further detail below with reference to FIG. 5 and FIG. 7 of the appended drawings. However, the probability of each of the latter failed transmission outcomes is generally small and may be brought down to a small value such as below 1.0%, or below 0.1%, by an appropriate setting of the value of N, or M. Thus, during multiple connection events, a third data package will be transmitted because either the first transmission of the first data package was successful or one of the at the most N retransmissions of the first data package was successful.

The present method may comprise terminating a current connection event in response to a successful transmission of the first, second and third data packages in the current connection event. Hence, this termination process allows the first portable communication device to transmit a single audio frame to the second portable communication device with the first data package and vice versa in respect of the second data package in the current connection event and receive express or positive receipt acknowledgement in respect of each of the first and second data packages. The first and second portable communication devices may enter their previously discussed power down modes in connection with the termination of the current connection event to save power.

On the other hand, if the first data package belongs to the second category, i.e. lacks audio data, and the second data package from the second portable communication device is absent or the acknowledgement indicator of the second data package unset, the method may comprise steps of:

flushing, deleting or abandoning the first data package where the first data package belongs to the second packet category, adding a section of data, for example the control data, of the first data package to a subsequent data package of the first or the second packet category for transmission during a subsequent connection event to the current connection event. The data of the first data package may comprise or be limited to the payload data of the first data package. Hence, the first communication device, or a controller such as a communication controller of the first communication device, may be configured strip the payload data, such as the control data, from the first data package and add these to the subsequent data package. In this manner, the payload data may reach the second portable communication device albeit with a delay.

According to one embodiment of the present method of exchanging data packages, a data package of the first packet category has a greater length or size than a data package of the second packet category. The size or length of data packages belonging to the first packet category may for example be at least two times the size or length of data packages belonging to the second packet category. This feature has several advantages for the reasons discussed in further detail below with reference to the appended drawings. The size or length of a data package belonging to the first packet category may lie between 20 bytes and 100 bytes.

In one embodiment, a data package of the first packet category comprises at least a header section, a payload section holding the audio data, and a data check section holding a package error-detection or error-correction code; and a data package of the second packet category comprises at least:

a header section and a data check section holding a package error-detection or error-correction code. The package error-detection or error-correction code may for example comprise a cyclic redundancy check (CRC) code. The header section of a data package may comprise a bit field or section holding or storing the acknowledgement indicator. Hence, the acknowledgement indicator may be represented by a single bit of the header section.

The header section of each of the first, second and third data packages may comprise a predetermined code or value (L) indicating the category of the data package. This feature will allow a receipt circuitry of the portable communication device such as the communication controller to rapidly and efficiently, i.e. using a low amount of power/energy, to determine which packet category a received data package belongs to by reading the predetermined code or value. Hence, the communication controller may take appropriate action based on the read predetermined code as discussed in further detail below with reference to the appended drawings.

Hence, one embodiment of the present method of exchanging data packages may comprise steps of:

evaluating the predetermined code or value (L) of at least the first or the second data package, retransmitting or discarding the first or the second data package in accordance with the predetermined code or value (L).

Some embodiments of the present method of exchanging data packages may comprise a step of checking the error-detection or error-correction code of the first or the second data package before proceeding to evaluating the predetermined code or value (L) as discussed above in connection with the evaluation of the acknowledgement indicator. If the error-detection or error-correction code indicates that the data of the first or the second data package is invalid, the data package in question may be flushed or discarded without evaluating its predetermined code or value (L).

Furthermore, the predetermined code or value may according to one embodiment point to, or indicate, an address or position of a data package of either packet category holding a particular type of payload data such as audio data and/or control data. The predetermined code may point to a start address of e.g. the control data, audio data or other data content of the data package. The presence of this pointer property of the predetermined code leads to a compact format of the data packages, i.e. small size. The compact format is achieved because the data package structure may dispense with ordinary overhead codes, fields or bits in front of each of the individual data sections to identify a beginning of each of these data sections. The pointer property of the predetermined code therefore allows a communication controller of the portable communication device to jump directly to respective start addresses of the various data portions of the received data packages and read the data content thereof. This direct access to the relevant start addresses saves the communication controller from parsing or decoding all data bytes of the received data package to detect locations of the desired data portions or fields of the data package as discussed in further detail below with reference to the appended drawings. Various structures of data packages of the first category and structures of data packages of the second category are discussed in further detail below with reference to the appended drawings.

According to yet another embodiment of the present method of exchanging data packages, the wireless communication channel comprises a plurality of spaced apart frequency bands, such as between 60 and 120 frequency bands or between 70 and 100 frequency bands, spanning across a predetermined radio frequency range. A bandwidth of each of the frequency bands may lie between 0.5 MHz and 3.0 MHz. The plurality of spaced apart frequency bands may be located in the industrial scientific medical (ISM) radio frequency range or frequency band such as the 2.40-2.50 GHz band or the 902-928 MHz band. The plurality of spaced apart frequency bands may alternatively be located in another suitable frequency band. In some embodiments, the bi-directional wireless communication channel may be based on near-field magnetic coupling between inductive coils of the first and second portable communication devices. In the latter embodiment, the plurality of spaced apart frequency bands may be arranged in a radio frequency range below 2 GHz, for example below 1 GHz, or below 500 MHz.

The first, second and any subsequent data packages may be transmitted on different frequency bands of the plurality of spaced apart frequency bands, where the different frequency bands are selected in accordance with a predetermined frequency hopping key or algorithm as discussed in further detail below with reference to the appended drawings.

Alternatively, rather than selecting frequency bands following the predetermined frequency hopping key, a favoured or golden frequency band with particularly favourable data transmission qualities, e.g. low packet error ratio, may be selected for the first attempt to transmit the first data package and/or for the first attempt to transmit the second package. According to the latter embodiment, this first attempt to transmit the first data package and/or first attempt to transmit the second package may be the first attempt to transmit a first data package of each connection event and/or a first attempt to transmit a second data package of each connection event of the previously discussed successive connection events.

The skilled person will understand that different criteria may be applied for characterizing the data transmission qualities of the plurality of spaced apart frequency bands and selecting the favoured or golden frequency band. One embodiment of the present methodology may rely on packet error ratios for quality characterization and comprise further steps of:

detecting at the first or the second wireless communication device, respective transmission quality estimators, such as respective packet error ratios (PERs), of the plurality of spaced apart frequency bands, determining a favoured frequency band based on a plurality of detected transmission quality estimators, transmitting at least the first and second data packages a first time on the favoured frequency band.

The methodology may comprise adding a band identifier indicating the favoured frequency band to a predetermined header field of the header section of each of the first and second data packages. This embodiment allows the first and second portable communication devices to track changes in the identity of the favoured or golden frequency band as RF noise conditions changes over time as discussed in further detail below with reference to the appended drawings.

If the first transmission attempt of the first data package fails, this may indicate less favourable transmission qualities through the golden frequency band than expected and hence one embodiment of the present methodology may comprise steps of:

selecting, in accordance with a predetermined frequency hopping key, a different frequency band of the plurality of spaced apart frequency bands than the favoured frequency band, retransmitting the first data package on the different frequency band; and optionally:

transmitting subsequent data packages on different frequency bands selected in accordance with the predetermined frequency hopping key.

A second aspect of one or more embodiments described herein relates to a wireless binaural hearing aid system configured to exchange data packages over a bi-directional wireless communication channel. The hearing aid system comprising: a first hearing instrument comprising a first radio transceiver and a second hearing instrument comprising a second radio transceiver where said first hearing instrument comprising a first communication controller coupled to the first radio frequency transceiver and said second hearing instrument comprises a second communication controller coupled to the second radio transceiver. The first communication controller being configured to:

generating a first data package belonging to a first packet category comprising audio data or to a second packet category without audio data, and adding an acknowledgement indicator with a default setting to the first data package, transmitting the first data package to the second portable communication device through the wireless communication channel, monitoring the wireless communication channel for a second data package belonging the first or second packet category transmitted by the second portable communication device subsequent to receipt of the first data package, receiving the second data package at the first portable communication device, and if an acknowledgement indicator of the second data package is set:

generating a third data package comprising an acknowledgment indicator setting reflecting successful or failed receipt of the second data package, and transmitting the third data package to the second portable communication device through the wireless communication channel; or if the acknowledgement indicator of the second data package is unset or the second data package is absent:

setting the acknowledgment indicator of the first data package to reflect a failed receipt of the second data package and retransmitting the first data package to the second portable communication device, wherein the retransmission of the first data package is carried out for at the most N times if the first data package belongs to the first packet category;

N being a positive integer number between 1 and 4.

The skilled person will understand that the second communication controller of the second hearing instrument may operate in a corresponding manner to the corresponding circuit of the first hearing instrument. The exchange of data packages afforded by the present wireless binaural hearing aid system enables digital exchange of numerous types of useful data, such as real-time digital audio signals or digital audio streams, signal processing parameters, control data, such as volume control settings, identification of signal processing programs, etc.

Each of the first and second hearing instruments or hearing aids may comprise:

an input transducer, such as one or several microphones, configured to output an audio signal based on a signal applied to the input transducer and representing sound, a hearing loss processor configured to compensate a hearing loss of a user of the hearing aid and output a hearing loss compensated audio signal. The hearing loss compensated audio signal may be adapted to restore loudness such that loudness of the applied signal as it would have been perceived by a normal listener substantially matches the loudness of the hearing loss compensated signal as perceived by the user. Each of the first and second hearing instruments or hearing aids may additionally comprise an output transducer, such as a receiver or loudspeaker, an implanted transducer, etc., configured to output an auditory output signal based on the hearing loss compensated audio signal that can be received by the human auditory system, whereby the user hears the sound. The input transducer may also comprise a telecoil that converts a time-varying magnetic field at the telecoil into a corresponding varying analogue audio signal in which the instantaneous voltage of the audio signal varies continuously with the varying magnetic field strength at the telecoil. Telecoils may be used to increase the signal to noise ratio of speech from a speaker addressing a number of people in a public place, e.g. in a church, an auditorium, a theatre, a cinema, etc., or through a public address systems, such as in a railway station, an airport, a shopping mall, etc. Speech from the speaker is converted to a magnetic field with an induction loop system (also called "hearing loop"), and the telecoil is used to magnetically pick up the magnetically transmitted speech signal. The input transducer may further comprise at least two spaced apart microphones, and a beamformer configured for combining microphone output signals of the at least two spaced apart microphones into a directional microphone signal. The input transducer may comprise one or more microphones and a telecoil and a switch, e.g. for selection of an omnidirectional microphone signal, or a directional microphone signal, or a telecoil signal, either alone or in any combination, as the audio signal. Typically, the analogue audio signal is made suitable for digital signal processing by conversion into a corresponding digital audio signal in an analogue-to-digital converter whereby the amplitude of the analogue audio signal is represented by a binary number. In this way, a discrete-time and discrete-amplitude digital audio signal in the form of a sequence of digital values represents the continuous-time and continuous-amplitude analogue audio signal. Throughout the present disclosure, the "audio signal" may be used to identify any analogue or digital signal forming part of the signal path from the output of the input transducer to an input of the hearing loss processor. Throughout the present disclosure, the "hearing loss compensated audio signal" may be used to identify any analogue or digital signal forming part of the signal path from the output of the hearing loss processor to an input of the output transducer possibly via a digital-to-analogue converter.

Each of the first and second radio transceivers may comprise both a wireless transmitter and a wireless receiver. The transmitter and receiver may share common circuitry and/or a single housing. Alternatively, the transmitter and receiver may share no circuitry, and the wireless communication unit may comprise separate devices with the transmitter and the receiver, respectively. Signal processing in each of the first and second portable communication device may be performed by dedicated hardware or may be performed in one or more signal processors, or performed in a combination of dedicated hardware and one or more signal processors. Likewise, the operations performed by each of the first and second communication controllers may be performed by dedicated hardware or may be performed in one or more processors, or performed in a combination of dedicated hardware and one or more processors. As used herein, the terms "processor", "signal processor", "controller", "system", etc., are intended to refer to microprocessor or CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program. By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry. Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

A method of exchanging data packages between a first portable communication device and a second portable communication device over a bi-directional wireless communication channel, where at least one of the first and second portable communication devices comprises a hearing instrument, includes: generating, by the first portable communication device, a first data package belonging to a first packet category comprising audio data or to a second packet category without audio data; adding an acknowledgement indicator with a default setting to the first data package; transmitting the first data package from the first portable communication device to the second portable communication device through the wireless communication channel; if the first portable communication device receives a second data package, and if an acknowledgement indicator of the second data package is set: generating, at the first portable communication device, a third data package comprising an acknowledgment indicator setting reflecting successful or failed receipt of the second data package; and transmitting the third data package to the second portable communication device through the wireless communication channel; and if the acknowledgement indicator of the second data package is unset, or if the first portable communication device fails to receive the second data package: setting the acknowledgment indicator of the first data package to reflect failed receipt of the second data package; and retransmitting the first data package from the first portable communication device to the second portable communication device, wherein the retransmission of the first data package is carried out for at the most N times if the first data package belongs to the first packet category, N being a positive integer between 1 and 4.

Optionally, the method further includes: checking an error-detection code of the second data package subsequent to receipt of the second data package at the first portable communication device; and if the error-detection code indicates invalid data of the second data package, ignoring the acknowledgment indicator of the second data package, and unsetting an acknowledgment indicator of the third data package to reflect failed receipt of the second data package.

Optionally, the method further includes: receiving the first data package at the second portable communication device; generating, by the second portable communication device, the second data package with the acknowledgment indicator setting reflecting successful or failed receipt of the first data package; transmitting the second data package from the second portable communication device to the first portable communication device through the bi-directional wireless communication channel; receiving the first data package or the third data package at the second portable communication device; if the acknowledgement indicator of the first or third data package is set: discarding retransmission of the second data package; and if the acknowledgement indicator of the first or the third data package is unset: retransmitting the second data package from the second portable communication device to the first portable communication device for at most M times if the second data package belongs to the first packet category, M being a positive integer number between 1 and 4.

Optionally, the method further includes: establishing a plurality of successive connection events through the wireless communication channel; wherein the first data package is transmitted during at least one connection event of the plurality of successive connection events.

Optionally, the method further includes: retransmitting the first data package for at most N times during the at least one connection event if the first data package belongs to the first packet category; and/or retransmitting the second data package for at most M times during the at least one connection event if the second data package belongs to the first packet category.

Optionally, the plurality of consecutive connection events are separated by disconnect time periods or idle time periods without data package exchange between the first portable communication device and the second portable communication device.

Optionally, the method further includes powering down respective transceiver circuits of the first portable communication device and the second portable communication device during the disconnect time periods.

Optionally, if the first portable communication device fails to receive the second data package or if the acknowledgement indicator of the second data package is unset, the method further comprises flushing or abandoning the first data package if the first data package belongs to the second packet category.

Optionally, the method further includes: if the acknowledgement indicator of the second data package is unset, or if the first portable communication device fails to receive the second data package: discarding retransmission of the first data package in a current connection event if the first data package belongs to the second packet category; and adding a section of data of the first data package to a subsequent data package for transmission during a subsequent connection event.

Optionally, the method further includes: if the transmission and N retransmissions of the first data package fails: flushing the first data package; generating a fourth data package of the first packet category; and transmitting the fourth data package from the first portable communication device to the second portable communication device through the wireless communication channel.

Optionally, the method further includes: if the transmission and M retransmissions of the second data package fails, and if the second data package belongs to the first packet category: flushing the second data package; generating a fourth data package of the first packet category; and transmitting the fourth data package from the second portable communication device to the first portable communication device through the wireless communication channel.

Optionally, a data package of the first packet category has a greater size than a data package of the second packet category.

Optionally, the data package of the first packet category comprises at least a header section, a payload section holding the audio data, and a data check section holding a package error-detection; and wherein the data package of the second packet category comprises at least a header section and a data check section holding a package error-detection or error-correction code.

Optionally, the third data package belongs to the second packet category.

Optionally, a header section the first data package comprises a predetermined code or value (L) indicating a category of the first data package.

A wireless binaural hearing aid system configured to exchange data packages over a bi-directional wireless communication channel, includes: a first hearing instrument comprising a first radio transceiver, and a first communication controller coupled to the first radio transceiver; and a second hearing instrument comprising a second radio transceiver, and a second communication controller coupled to the second radio transceiver; wherein the first communication controller is configured for: generating a first data package belonging to a first packet category comprising audio data or to a second packet category without audio data; adding an acknowledgement indicator with a default setting to the first data package; and transmitting the first data package to the second hearing instrument through the wireless communication channel; if the first portable communication device receives a second data package and if an acknowledgement indicator of the second data package is set: generating a third data package comprising an acknowledgment indicator setting reflecting successful or failed receipt of the second data package, and transmitting the third data package to the second hearing instrument through the wireless communication channel; and if the acknowledgement indicator of the second data package is unset, or if the first hearing instrument fails to receive the second data package: setting the acknowledgment indicator of the first data package to reflect failed receipt of the second data package; and retransmitting the first data package to the second hearing instrument, wherein the retransmission of the first data package is carried out for at most N times if the first data package belongs to the first packet category, N being a positive integer between 1 and 4.

Other aspects and features will be evident from reading the following detailed description.

BRIEF DESCRIPTION OF THE DRAWINGS

In the following, preferred embodiments are described in more detail with reference to the appended drawings, wherein.

DETAILED DESCRIPTION OF EMBODIMENTS

Figure 1:
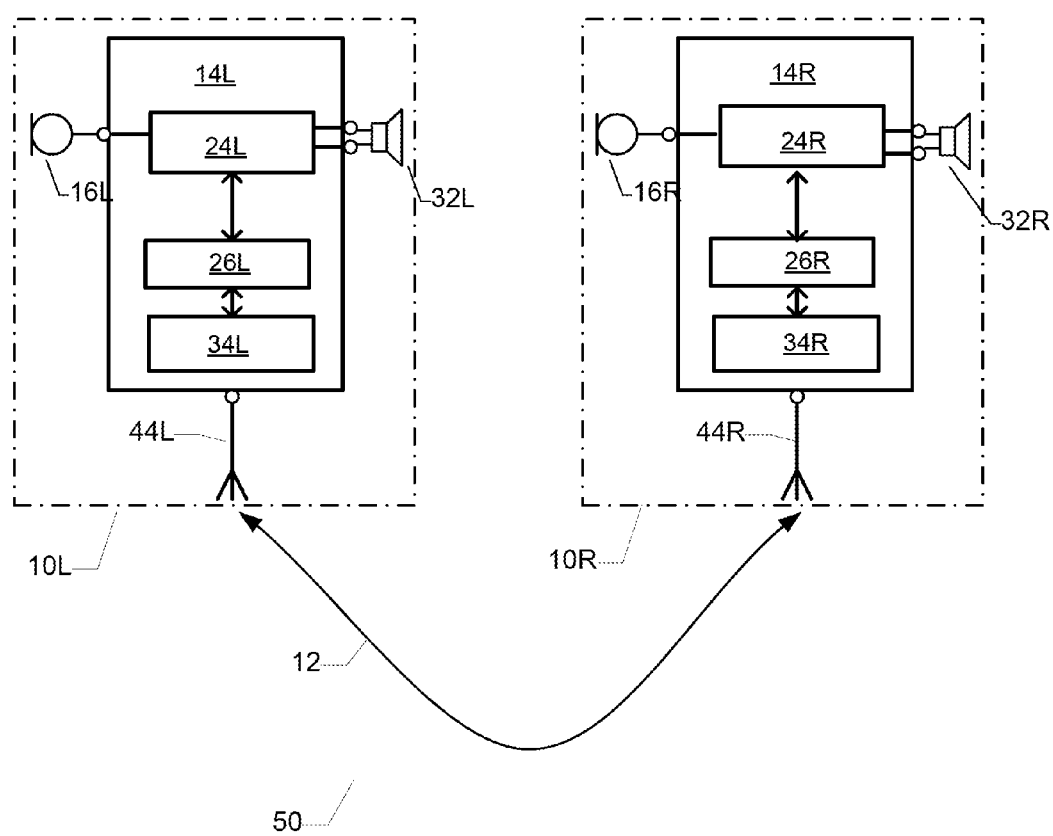
FIG. 1 schematically illustrates a wireless binaural hearing aid system in accordance with a first embodiment, where the system comprises a first hearing instrument and a second hearing instrument connected via a bi-directional wireless communication channel, FIG. 1A) schematically illustrates a wireless hearing aid system in accordance with a second embodiment, where the system comprises a first hearing instrument and a portable communication device connected via a bi-directional wireless communication channel, FIG. 2 schematically illustrates exemplary data package layouts for data packages transmitted between portable devices of the wireless hearing aid system or the wireless binaural hearing aid system.
Figure 1A:
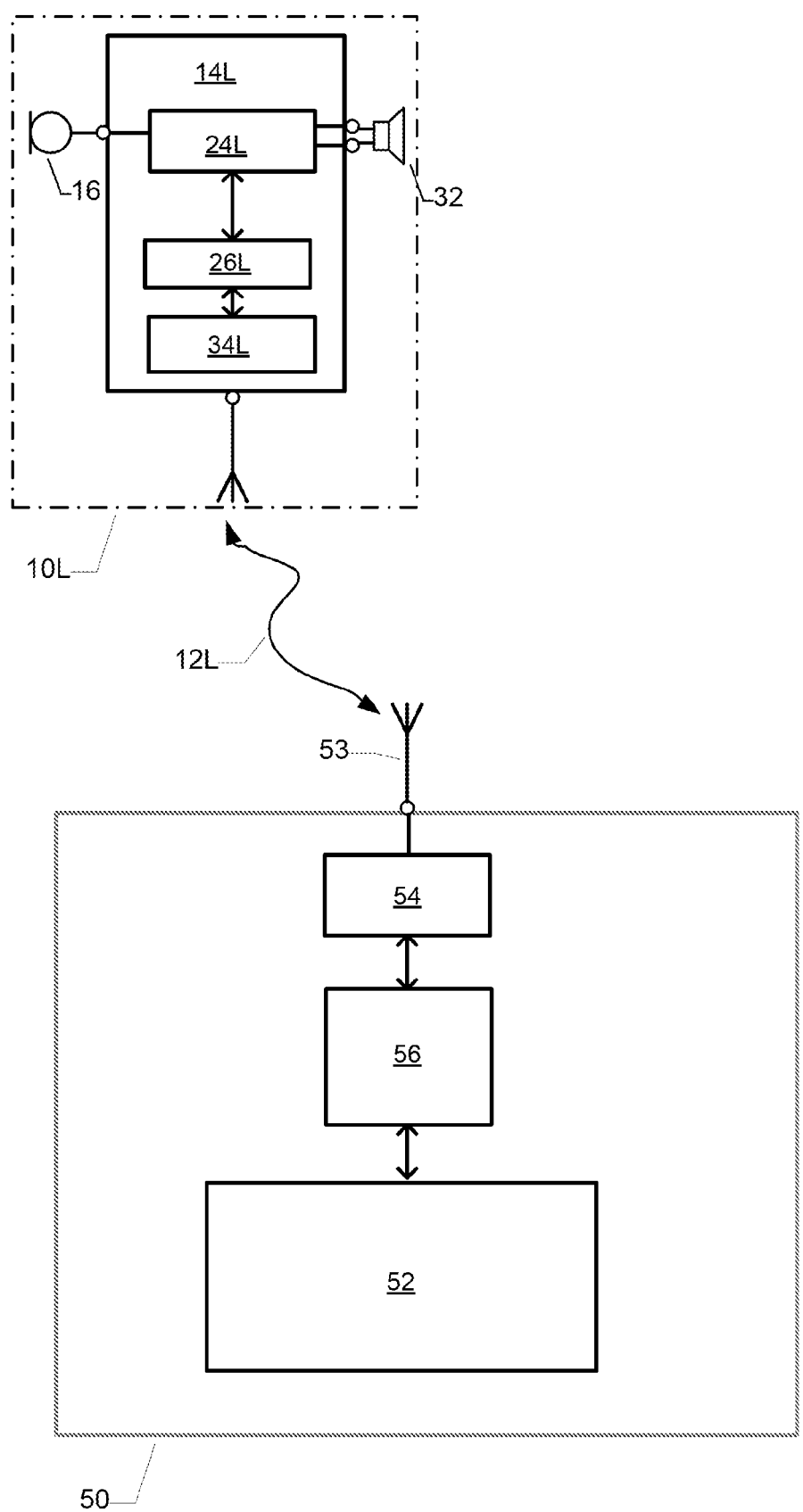

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the present methodology of exchanging data packages between a first portable communication device and a second portable communication device over a bi-directional wireless communication channel are described with reference to the appended drawings. At least one of the first and second portable communication devices comprises a hearing instrument as discussed in additional detail below.

FIG. 1 schematically illustrates a wireless binaural hearing aid system comprising a left ear hearing aid or instrument 10L and a right ear hearing aid or instrument 10R, each of which comprises a wireless communication unit for connection to the other hearing instrument or alternatively another audio-enabled portable communication device such as a smartphone or mobile phone, an audio-enabled tablet, a cordless phone, a TV-set, a portable microphone array etc. In the present embodiment, the left ear and right ear hearing aids 10L, 10R are connected to each other via a bi-directional wireless communication channel or link 12. A unique ID may be associated with each of the left ear and right ear hearing aids 10L, 10R. The illustrated binaural hearing aid system may be configured to operate in the 2.4 GHz industrial scientific medical (ISM) band and may comprise between 60 and 120 spaced apart frequency bands or channels. Each of the spaced apart frequency bands or channels may possess a bandwidth between 0.5-2.0 MHz such as about 1.0 MHz.

The left hearing aid 10L and the right hearing aid 10R may be substantially identical in some embodiments expect for the above-described unique ID such that the following description of the features of the left hearing aid 10L also applies to the right hearing aid 10R. The left hearing aid 10L may comprise a $ZnO_2$ battery (not shown) that is connected for supplying power to the hearing aid circuit 14. The left hearing aid 10L comprises an input transducer in the form of a microphone 16. The microphone 16 outputs an analogue or digital audio signal based on an acoustic sound signal arriving at the microphone 16 when the left hearing aid 10L is operating. If the microphone 16 outputs an analogue audio signal the hearing aid circuit 14 may comprise an analogue-to-digital converter (not shown) which converts the analogue audio signal into a corresponding digital audio signal for digital signal processing in the hearing aid circuit 14. In particular in a hearing loss processor 24L that is configured to compensate a hearing loss of a user of the left hearing aid 10. Preferably, the hearing loss processor 24L comprises a dynamic range compressor well-known in the art for compensation of frequency dependent loss of dynamic range of the user often termed recruitment in the art. Accordingly, the hearing loss processor 24L outputs a hearing loss compensated audio signal to a loudspeaker or receiver 32L. The loudspeaker or receiver 32 converts the hearing loss compensated audio signal into a corresponding acoustic signal for transmission towards an eardrum of the user. Consequently, the user hears the sound arriving at the microphone; however, compensated for the user's individual hearing loss. The hearing aid may be configured to restore loudness, such that loudness of the hearing loss compensated signal as perceived by the user wearing the hearing aid 10 substantially matches the loudness of the acoustic sound signal arriving at the microphone 16 as it would have been perceived by a listener with normal hearing.

The hearing aid circuit 14 further includes a wireless communication unit which comprises a radio portion or transceiver 34L that is configured to communicate wirelessly with the right or second hearing aid 10R. The wireless communication unit comprises a first communication controller 26L performing various communication protocol related tasks and possibly other tasks. The hearing loss processor 24L may comprise a software programmable microprocessor such as a Digital Signal Processor. The operation of the left hearing aid 10L may be controlled by a suitable operating system executed on the software programmable microprocessor. The operating system may be configured to manage hearing aid hardware and software resources, e.g. including the hearing loss processor 24L and possibly other processors and associated signal processing algorithms, the wireless communication unit, certain memory resources etc. The operating system may schedule tasks for efficient use of the hearing aid resources and may further include accounting software for cost allocation, including power consumption, processor time, memory locations, wireless transmissions, and other resources. The operating system controls in cooperation with the first communication controller 26L the radio transceiver 34L to perform the bi-directional wireless communication with the right or second hearing aid 10R in accordance with the present methodology or protocol for exchange of data packages. The right or left hearing aid may operate as a master device and the other hearing aid as a slave in connection with bi-directional data communication between the hearing aids.

The data packages generated and transmitted by the each of the left hearing aid 10L and right hearing aid 10R may comprise audio data such that each hearing aid may receive and deliver a binaurally processed hearing loss compensated audio signal to the user or patient via the respective loudspeakers or receivers 32L, 32R. Alternatively, only data packages generated and transmitted by single one of the left and right hearing aids 10L, 10R comprises the audio data, such as real time audio data or audio samples, while the other hearing aid solely transmits data packages with various kind of control information or data for example to synchronize operation between the left and right hearing aids 10L, 10R. Hence, according to this latter embodiment only one of the left and right hearing aids performs binaural processing of the hearing loss compensated audio signal. This processing scheme is often utilized in so-called CROSS hearing aid systems.

Figure 2:
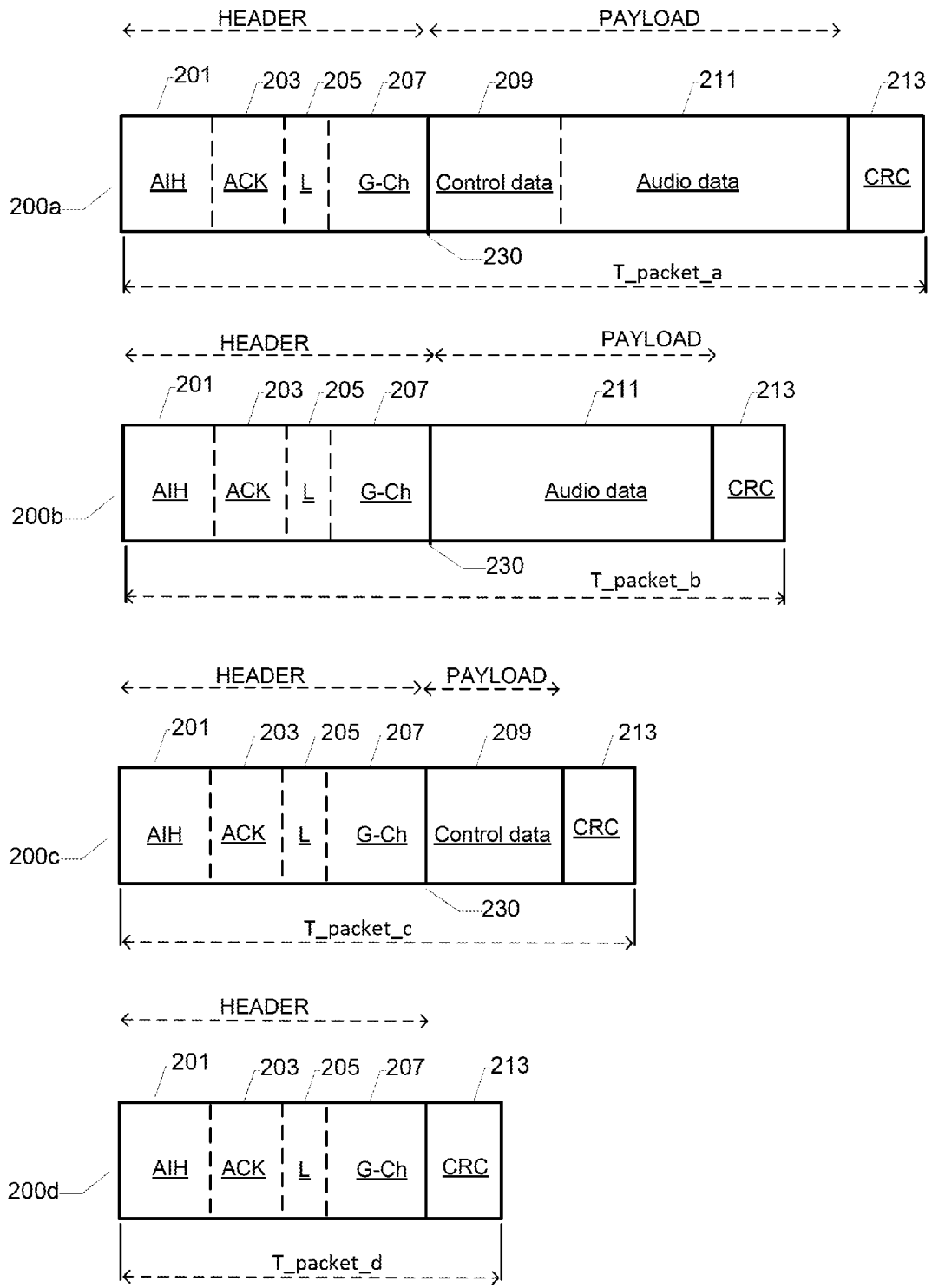

FIG. 2 schematically illustrates four exemplary data packages 200a, 200b, 200c, 200d of different types transmitted between the left and right hearing aids 10L, 10R of the wireless binaural hearing aid system 50. The features and layout of each of these types of data packages 200a, 200b, 200c, 200d are discussed in detail below.

Figure 3:
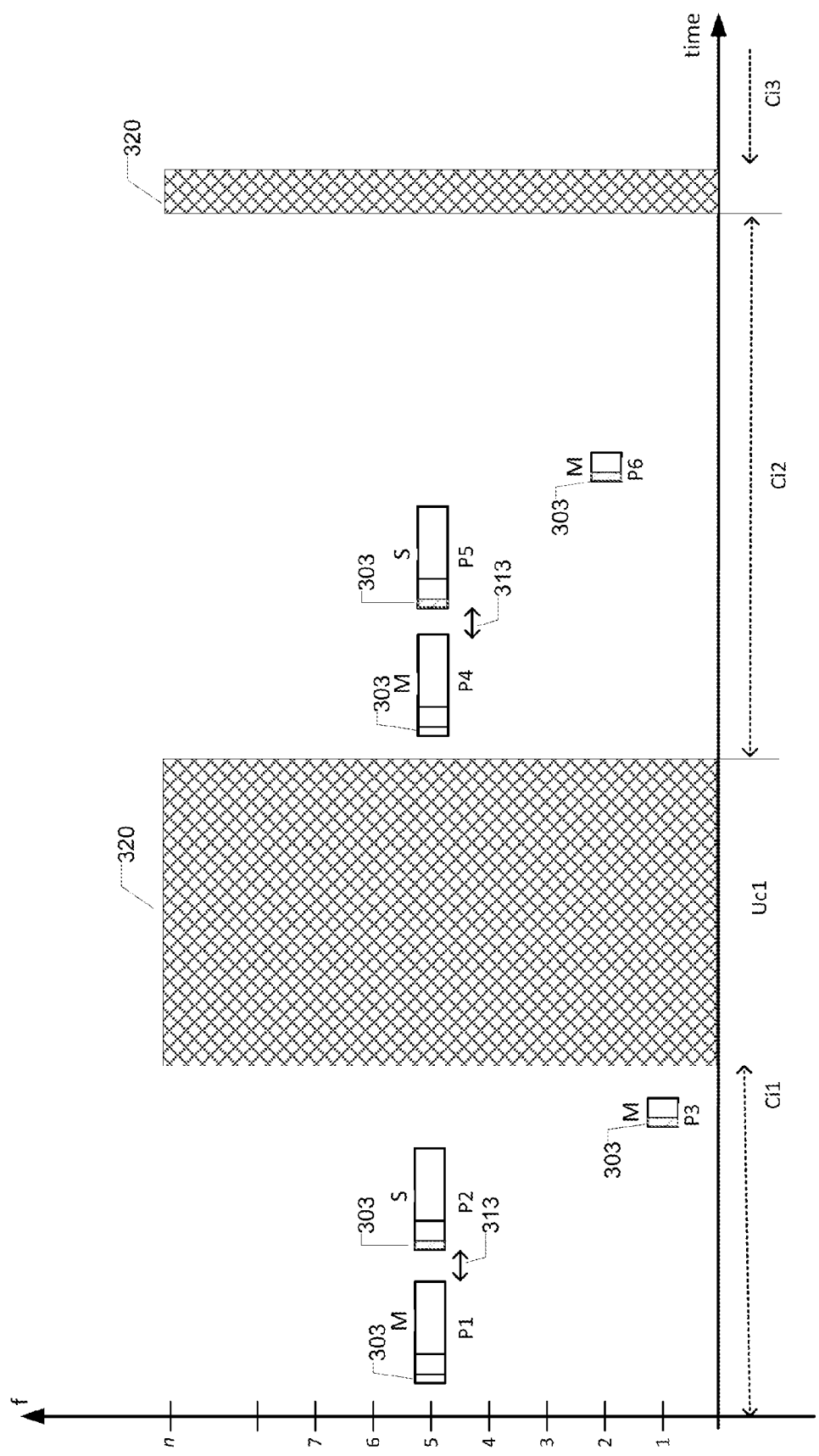
FIG. 3 shows a schematic time-frequency diagram of a first exemplary transmission of data packages between the first and second hearing instruments in accordance with embodiments.

FIG. 3 is a schematic time-frequency diagram or plot of a first exemplary transmission of data packages P1, P2, P3, P4, P5 of different categories between the left and right hearing aids 10L, 10R in accordance with various embodiments. The illustrated first exemplary transmission of data packages will typically correspond to environmental conditions with low levels of interfering electromagnetic noise in the utilized frequency band or bands such that transmission of each data package may be successful at the first transmission attempt or first transmission. In the latter situation there is no need for retransmission of the data packages. However, the present data package transmission methodology and protocol for exchange of data packages are designed to cope with a significant error rate in the transmitted data packages. This feature is particularly helpful for data package transmission in wireless binaural hearing instrument systems where the shadowing effect of the user's head often leads to a relatively high packet error rate (PER). The data package transmission methodology may enable retransmission of lost data packages of a first packet category with audio data. The number of retransmission of a data package of the first packet category may be limited to a certain maximum number of times such as between 1 and 4 times (e.g., 1 time, 2 times, 3 times, or 4 times). The loss of data packages may occur for numerous reasons such as air collisions with other radio frequency traffic in the utilized frequency band. There are several noticeable advantages of applying this type of limitation to the number of retransmissions of a particular data package of the first packet category such as limiting consumed transmission energy per transmitted audio frame and provide an upper bound on package transmission latency. The package transmission latency is an important feature of the transmission methodology or protocol if the respective audio data or frames of the data packages represent real time audio signals of the left and/or right hearing aids 10L, 10R. The loss of audio frames from time to time when a particular data package has been unsuccessfully retransmitted the maximum number of times, e.g. 4 times, may be mitigated by adding a suitable audio codec to the hearing aid circuit 14L, 14R. The audio codec may be able to handle a certain amount of audio frame loss of an incoming real time audio data stream from the first or second communication controller 26L, 26R. The audio codec may for example be configured to execute a Packet Loss Concealment algorithm to perceptually mask the lost audio frames of incoming real time audio data stream.

A connection between the left and right hearing aids 10L, 10R needs to be established prior to exchanging the data packages. This connection may be permanent or intermittent during the operation of the left and right hearing aids 10L, 10R. To initialize or establish the connection, the left hearing aid 10L may be configured as Master (M) device and the right hearing aid 10R as a Slave (S) device in accordance with the Bluetooth LE protocol. Consequently, in accordance with the Bluetooth LE protocol the slave hearing aid 10R may start to transmit advertising messages at constant time intervals on the three frequency bands in a random sequence, and listen for connect requests from the master hearing aid 10L. Once the slave hearing aid 10R receives a connect request from the master hearing aid 10L, the slave hearing aid 10R may be adapted to configure itself with a number of connection parameters provided by the master hearing aid 10L. The slave hearing aid 10R may thereafter start listening, i.e. monitoring the bi-directional wireless communication channel, for the data packages transmitted by the master hearing aid 10R at a time interval determined by the provided connection parameters. Similarly, during the connection phase, the master hearing aid 10L may listen for the advertising messages randomly on the three designated frequency channels for a short time period. If no connection has been established for the given time period, it may be assumed that there is no remote hearing instrument available and the connection initialization process or protocol may be terminated. The connection parameters may include one or more of: transmission interval, payload size, channel data rate, hopping key or scheme, maximum number of package retransmissions N, etc.

As shown on the schematic time-frequency diagram 300 of FIG. 3, the first exemplary transmission of data packages P1, P2, P3, P4 and P5 uses an intermittent data exchange scheme comprising a plurality of successive connection events of a predetermined duration for the exchange of the data packages. Consecutive connection events on the bi-directional wireless communication channel 12 are indicated by Ci1, Ci2, Ci3, etc. along time axis t. The skilled person will understand that the illustrated adjacent connection events such as Ci1 and Ci2 may be separated in time by disconnect time periods/idle time periods 320. The time separation, or transmission interval, between a pair of adjacent connection events such as Ci1 and Ci2 or Ci2 and Ci3 etc. may lie between 2 ms and 20 ms such as between 5 ms and 10 ms. The duration of the connection events Ci1, Ci2, Ci3 etc. will generally vary over time depending on the required number of retransmissions of the first and/or second data packages P1, P2, the channel data rate and the size of the data packages. The channel data rate may be placed between 0.5 Mbit/s and 2 Mbit/s. The duration of each of the successive connection events may for example lie between 0.5 ms and 5 ms such as between 0.9 ms and 2.5 ms. In the latter case, this may correspond to a first category data package size of 30 bytes with a maximum number of retransmissions set to N=3. Furthermore, the transmission protocol utilized in the present embodiment attempts to, in each connection event, successfully transmit a single data package with audio data from left to the right hearing aid and vice versa. Hence, once each of the left and right hearing aids 10L, 10R has successfully transmitted its data package during a particular connection event, the hearing aid in question may switch to an idle or low-power mode associated with the idle time periods 320. During the idle mode, the radio transceiver 34L of the left hearing aid 10L and the radio transceiver 34R of the left hearing aid may be powered down to reduce power consumption of the respective hearing aids. The skilled person will understand that the bi-directional wireless communication channel 12 may be permanently connected in other embodiments, i.e. without the idle time periods 320 between successive connection events.

The y-axis of schematic time-frequency diagram 300 indicates the frequency band number, n, of the previously discussed plurality of spaced apart frequency bands or channels of the bi-directional wireless communication channel. As illustrated by the schematic time-frequency diagram 300, the present embodiment of the methodology of exchanging data packages comprises steps of adding an acknowledgement indicator to each of the transmitted data packages P1, P2, P3, P4 and P5. The acknowledgement indicator is preferably added to a particular field or bit of a header section (refer to 203 of FIG. 2) of each of the transmitted data packages. A set/asserted acknowledgement indicator is illustrated by a hatched field 303 of the data package while an unset acknowledgement indicator is illustrated by a blank field 303. A set acknowledgement indicator of a particular data package such as P2 indicates that a previously transmitted data package to P2 by the same hearing aid was correctly received at the left or right hearing instrument as the case may be. Consequently, the asserted acknowledgement indicator of P2 indicates that the previous data package P1, transmitted by the left hearing aid 10L, was correctly received at the right hearing aid 10R. Likewise, the asserted acknowledgement indicator of a data package P3, transmitted by the right hearing aid 10R through the wireless communication channel subsequently to its receipt of P2, indicates that P2 was correctly received at the left hearing aid 10L. The settings of the acknowledgement indicators of the transmitted data packages such as P1, P2, P3 etc. may be carried out by the respective communication controllers 26L, 26R (please refer to FIG. 1) of the left and right hearing aids. Each of the communication controller 26L, 26R may be configured to access and manipulate the relevant field or bit (refer to item 203 of FIG. 2) of the header section of each of the data packages as required before transmission of the data package in question.

During the first connection event Ci1 through the wireless communication channel 12 between the left and right hearing instruments, the communication controller 26L is generating the first data package P1 by identifying, retrieving and adding the necessary data bits or bytes to the appropriate fields or positions of the selected type or category of data package. Several types of data packages 200a, 200b, 200c, 200d with differing data content may exist as illustrated on FIG. 2. The first and second types of data packages 200a, 200b comprise audio data and therefore belong to the first packet category. The third and fourth types of data packages 200c, 200d lack audio data and therefore belong to the second packet category. The first type of data package 200a has typically a larger size than the second type data package 200b due to the lack of control data in the later type of data package. However, the size of the second type of data package 200b of the first packet category may be at least two times larger than the largest one of the third and fourth types of data packages 200c, 200d belonging to the first packet category.

In the present embodiment, the first data package P1 belongs to the previously discussed first packet category for example the data package type 200a or data package type 200b, schematically illustrated on FIG. 2, which are distinct from the second data packet category by their content of audio data. The audio data is held in a payload section or portion 211 of the data package types 200a or 200b. The payload section of the data package type 200b contains exclusively audio data while the payload section of the data package type 200a in contrast contains at least audio data and control data. In both types of data packages 200a and 200b, the audio data typically comprises an audio frame which may have a size corresponding to between 2 ms and 5 ms of a real-time audio data stream. The audio data portion 211 of the payload section may comprise between 10 and 40 bytes of audio data. The speed of the underlying real-time audio stream may lie between 16 kbit/s and 96 kbit/s such as between 32 kbit/s and 48 kbit/s.

In connection with the generation of the first data package P1, the acknowledgement indicator 303 of P1 is unset by the communication controller 26L by default before transmission to the right hearing instrument via the radio transceiver 34L and the RF antenna 44L. Since, P1 is the first data package in the connection event there exist no previous data package for which to acknowledge receipt. In the right or slave hearing aid 10R, the communication controller 26R is configured to monitoring the wireless communication channel 12 for receipt of the first data package P1. The first data package P1 is expected at a particular time window as discussed in further detail below. If and once P1 is received at the right hearing aid 10R (S), the associated communication controller 26R checks the data content of P1 based on a priori knowledge of the layout of the first and second categories of data packages 200a, 200b, 200c, 200d of the communication protocol. This check includes a check of an error-detecting code, such as CRC, in an error code section 213 of P1. The error-detecting code indicates whether or not the data content of P1 is corrupted or invalid. Assuming the CRC check shows that the data held in P1 is uncorrupted, the communication controller 26R generally evaluates the setting of the acknowledgement indicator 303 of P1 by reading the relevant bit field of the header section of P1. The communication controller 26R may, however, ignore the setting of the acknowledgement indicator 303 of P1 one time at the first attempt to transmit a new data package P2. This is because this is the first attempt to transmit this data package P2 during the first connection event Ci1 such that the success or failure of a previous transmission of P2 is irrelevant. The communication controller 26R is preferably configured to evaluate and respond to the setting of the acknowledgement indicator of each data package received from the left hearing aid after the first attempt transmission of P1—for example the acknowledgement indicator of P3 in the present example. These later data packages may be retransmitted versions of P1 in other examples. If the acknowledgement indicator of a such as later data package is set or asserted, the communication controller 26R is informed that the previously transmitted data package by the right hearing aid 10R was correctly received at the left or master hearing aid 10L. Consequently, no re-transmission of this previous data package is needed or carried out by the right hearing instrument 10R no matter of the actual packet category of this previous data package. The new data package P2 may comprise a new audio frame relative to the audio data of a previous data package transmitted by right hearing aid 10R during the connection event previous to Ci1. The skilled person will appreciate that these audio frames of the previous data package and the audio frame of P2 may be adjacent segments of a real-time audio stream derived from a microphone signal of the right hearing aid.

If the above-mentioned CRC check of the received data package P1 indicates valid or uncorrupted data, the communication controller 26R proceeds to set the acknowledgement indicator 303 of P2 in connection with the generation of the data content of P2. Thereafter, the communication controller 26R proceeds to transmit P2 to the left hearing aid 10L via the radio transceiver 34R and the RF antenna 44R. There is a time gap or separation 313 between the transmission of P1 and the transmission of P2 which is designated an "inter-frame spacing" which is the time from a last transmitted bit of P1 to a first received bit in P2 or for any pair of successive data packages in a particular connection event. This inter-frame spacing may line between 25 μs and 300 μs such as between 40 μs and 200 μs.

On the other hand in case the communication controller 26R finds that P1 is absent at the expected time window or the CRC check of P1 failed, the communication controller 26R concludes that the first attempt transmission of P1 was a failure and proceeds to unset the acknowledgement indicator 303 of P2 in connection with the generation of the data content of P2. Thereafter, the communication controller 26L proceeds to transmit P2 to the left hearing aid 10L as outlined above.

The communication controller 26L of the left hearing aid 10L is now monitoring the wireless communication channel 12 for receipt of the second data package P2 in a corresponding manner to the one discussed above in respect of the communication controller 26R of the right hearing aid 10R. Once P2 is received at the left hearing aid 10L via its radio transceiver 34L and the RF antenna 44L, the associated communication controller 26L checks the data of P2 in a similar manner as discussed above in respect of P1. If the CRC check shows uncorrupted data package content of P2, the communication controller 26L evaluates the setting of the acknowledgement indicator 303 as discussed above in respect of P1. If the acknowledgement indicator 303 of P2 is set or asserted, as indicated by the hatched bit field 303 of P2, the communication controller 26L concludes the previously transmitted data package, P1, by the left hearing aid 10L was correctly received at the right hearing aid 10R. Consequently, the communication controller 26L finds or concludes that retransmission of P1 is unnecessary independent of the actual packet category of P1. Hence, the communication controller 26L generates in response to the latter finding (i.e. P1 was correctly received), a new data package P3. The new data package P3 is preferably transmitted on another frequency band than P1 and P2 for example a particular predetermined frequency band such as frequency band No. 1 as illustrated on the plot 300. This feature is discussed in further detail below. Furthermore, since each of the communication controllers 26L, 26R of the left and right hearing aids now has transmitted the intended single data package comprising associated audio data, the data package P3 does not include audio data. The purpose of transmitting P3 is to inform the communication controller 26R/microprocessor of the right hearing aid 10R that its earlier transmitted data package P2 was actually successfully received at the left hearing aid 10L. On the other hand, if the first attempt to transmit P2 was unsuccessful or failure because P2 was either not received at the left hearing aid 10L or had corrupted data as indicated by a failed CRC check, the communication controller 26L responds by unsetting the acknowledgement indicator of P3. After receipt and evaluation of this P3 package, the communication controller 26R responds by retransmitting P2 for a limited number of times and discussed in further detail below with reference to FIG. 4. In the present embodiment, the new data package P3 belongs in either case to another packet category, e.g. second category without audio data, than the first and second data packages P1 and P2. The latter data packages both belong to the first packet category with audio data as illustrated by the exemplary data package layouts 200a and 200b depicted on FIG. 2. Each of the first and second data packages P1 and P2 may have a greater length or size than P3. The layout of P3 may be similar to either the exemplary data package 200c or the exemplary data package 200d of FIG. 2 since both of these data packages 200c, 200d belong to the second packet category lacking audio data. Hence, the size of P3 may be markedly smaller than the size of P1 and P2 such that the generation and transmission of P3 consume significantly less power than the generation and transmission of the first data package P1 or P2. The size or length of each of data packages P1 and P2 may lie between 20 bytes and 50 bytes while the size of P3 may less than half of that size. The content of P3 may be limited to the header section only as illustrated by the exemplary data package layout 200c of FIG. 2. This header section includes the appropriate bit field for the acknowledgement indicator 203 of P3 allowing P3 to function as a power efficient acknowledgement indicator confirming to the left hearing aid correct receipt at the right hearing aid of the previous data package P2. Hence, the size of a data package of the first category may be at least two times the size of a data package of the second category in some embodiments of the present methodology. The present embodiment of the data package transmission methodology involves the generation and transmission of data packages of different sizes within at least some of the successive connection events Ci1, Ci2, Ci3 etc. These differently sized data packages may belong to at least two distinct categories of which a first category includes data packages which comprises audio frames or audio data while a second category includes data packages which lack audio frames or audio data. The skilled person will understand that other embodiments may use data packages of constant size such that P3 has the same size as P1 and P2. Once the communication controller 26L/microprocessor of the left hearing aid 10L has successfully received P3 and found the acknowledgement indicator set, the communication controller 26L/microprocessor can conclude that the earlier transmitted data package P2 was successfully received at the right hearing aid 10RL. Hence, the communication controllers 26L, 26R of the left and right hearing aids, respectively, can conclude that all pending data packages with audio frames, i.e. P1 and P2, have been successfully transmitted to the other hearing aid in the current connection event Ci1. Hence, the communication controllers 26L, 26R preferably switches the respective the radio transceivers 34L, 34R, and possibly other circuitry involved in the bi-directional wireless interface handling, to an idle or low-power mode to save power. The communication controllers 26L, 26R may maintain these idle modes until the next connection event Ci2 is scheduled in accordance with the currently selected time separation between pairs of successive connection events. During these intermittent idle or power down periods 320, the bi-directional communication channel 12 may reside in a physically disconnected state, but logically connected state. At the subsequent connection event Ci2, the communication controllers 26L, 26R switch the respective radio transceivers 34L, 34R back to their operational states and the left and right hearing aids initialize the previously described connecting procedure to be ready for the generation and exchange of the subsequent data packages P4, P5 and P6 in a similar manner as described above in respect of P1, P2 and P3. Consequently, data packages P4, P5 and P6 may be viewed as a first data package, a second data package and a third data package, respectively, of the subsequent connection event Ci2 and so forth for each of the successive connection events Ci3, CiN etc.

Figure 7:
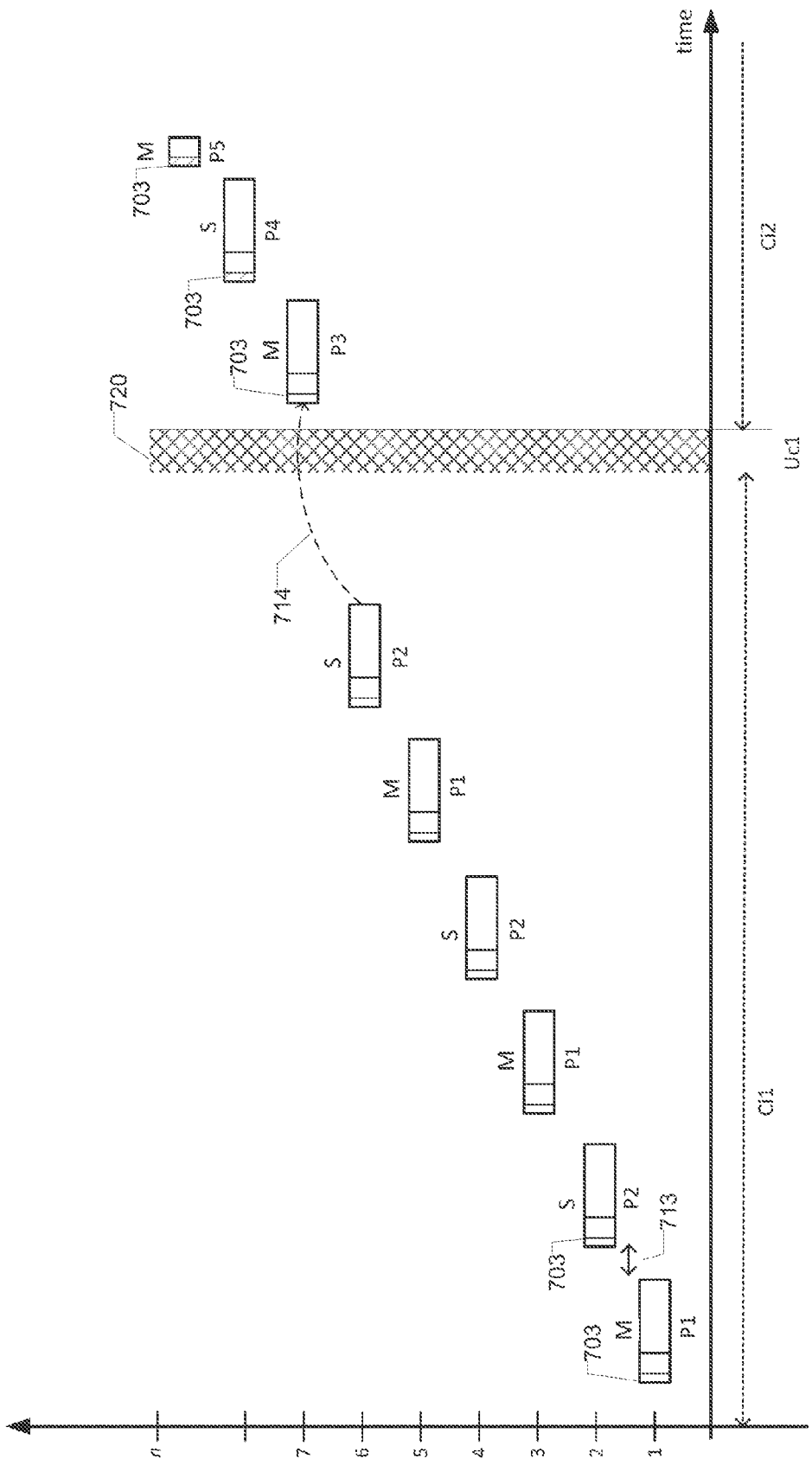
FIG. 7 shows a schematic time-frequency diagram of a fifth exemplary transmission of data packages of different between the first and second hearing instruments in accordance with embodiments.

The bi-directional wireless communication channel preferably comprises the previously discussed plurality of spaced apart frequency bands or channels, n, as discussed above. Different embodiments of the present methodology of exchanging data packages utilize different ways of distributing the transmitted data packages over the plurality of spaced apart frequency bands, i.e. different frequency hopping schemes. In some embodiments the first, second, third and any further data packages of each connection event are transmitted on different frequency bands of the plurality of spaced apart frequency bands. The different frequency bands may for example be selected in accordance with a predetermined frequency hopping key or algorithm. A relatively simple frequency hopping scheme or key may be utilized where a random hopping key is generated by the master device of the left and right hearing aids, i.e. 10L. The master/left hearing aid transmits the random hopping key to the right hearing aid 10R which is configured as slave device in the present embodiment. The random hopping key may be transmitted to the slave/right hearing aid 10R as part of the previously discussed transmission of connection parameters during initialization of a connection event. Each of the left and right hearing aids may thereafter use this random hopping key to select the appropriate frequency band to transmit and receive a particular data package on. The next frequency band of the plurality of spaced apart frequency bands may be selected as the previously used frequency band plus the hopping key. If the computed frequency band exceeds the number of available frequency bands, a modulus operation is preferably applied to the hopping key to determine or compute a frequency band within the available number of frequency bands. A new frequency band may for example be selected for each data package transmission to avoid a data package is retransmitted on a congested frequency band. FIG. 7 shows a schematic time-frequency diagram or plot of the transmission of data packages P1, P2, P3, P4 and P5 of different categories where the hopping key is set to 1 and the maximum number of retransmissions, N, is set to 2. Please note how the start frequency band for the next data package is synchronized to a known value at the first transmission of a data package in a new connection event such as Ci2. In this case, the start frequency band for the data package P3 of Ci2 is equal to the frequency band of the previous package, i.e. last transmission of P2 in the previous connection event Ci1, plus the hopping key, which is one in the present example as illustrated by dotted line 714. Hence, the frequency band for transmission of the data package P3 is band No. 6 where the last transmission of P2 was performed plus one which gives frequency band No. 7.

The frequency hopping key or scheme may be given by the following equation:

$$f_{n+1} = (f_n + h) \% p; \text{ where}$$

$f_n$ represents the frequency band at time instant n;
h represents the hopping key and n, h>=0 and positive integers;
% represents the modulus operator;
p is the number of spaced apart frequency bands.

The modulus value, %, may be selected to a prime number closest to the number of utilized frequency bands for example between 60 and 120. If the number of frequency bands is set to 78 the modulus value may accordingly be set to the closest prime number to 78 which is 79. The use of a prime number is preferable because it provides a good distribution of the transmitted data packages across the number of available frequency bands.

In an alternative embodiment of the frequency hopping scheme involves the determination of a favoured or "golden" frequency band amongst the plurality of spaced apart frequency bands. This embodiment of the frequency hopping scheme is for example utilized in the exemplary data package transmission sequence illustrated on FIG. 3 where frequency band or channel No. 5 is chosen as the favoured or "golden" frequency band. According to the latter embodiment, the methodology of exchanging data packages comprises steps of detecting, at the right hearing aid and/or left hearing aid, respective transmission quality estimators such as respective packet error ratios (PERs) of the plurality of spaced apart frequency bands and determining the favoured frequency band based on a plurality of detected transmission quality estimators. At least the first and second data packages, i.e. P1 and P2 for connection event Ci1, are transmitted a first time on the favoured frequency band within a particular connection event. There are numerous benefits of using the favoured or "golden" frequency band in the first attempt to send the first and second data packages if the frequency band with the lowest PER is selected as the favoured frequency band. The low PER of the favoured frequency band maximizes the likelihood of a successful first attempt transmission of one of both of the first and second data packages thereby reducing audio frame latency. This favoured frequency band scheme also minimizes the required power consumption for a successful transmission of the first and second data packages because the number of retransmissions of data packages is minimized in a statistical sense. Furthermore, the likelihood of a data package of the first category needs to be flushed or abandoned following N unsuccessful retransmissions is reduced leading to a reduced loss of audio frames at the receiving hearing aid. This feature leads to better sound quality of the received audio stream and lower power consumption of a possible package loss concealment algorithm running in the processor of the left or right ear hear hearing instrument. As illustrated on FIG. 3, where frequency band No. 5 is the favoured frequency band, the first and second data packages are transmitted a first time on that frequency band. The third data package P3 may be transmitted a first time on the favoured frequency band or another default frequency band such as frequency band No. 1 as illustrated. It may be advantageous to choose another frequency band than the favoured frequency band as illustrated for the first transmission of the data package P3 to get a valid or good statistical estimate of the PER of each of the plurality of frequency bands even when the favoured frequency band possesses favourable transmission quality. To compute a valid PER statistic for a particular frequency band there obviously needs to be a certain amount of data package traffic on the frequency band. During the second connection event Ci2, the new data packages P4 and P5 are likewise transmitted for a first time on the favoured frequency band No. 5 and the same scheme is preferably applied to the first attempt to transmit the first and second data packages of each of the further connection events. However, the sixth data package P6 is not transmitted on the favoured frequency band No. 5 in the second connection event Ci2, but on frequency band No. 4 in accordance with the chosen hopping key of one and the fact that the last data package of the previous connection event Ci1 was P3 on frequency band No. 3.

The communication controller 26L/microprocessor of the master hearing aid, i.e. the left hearing aid, may be configured to compute the respective PERs of the plurality of spaced apart frequency bands and determine the favoured frequency band based on a the computed PERs. The skilled person will understand that the communication controller 26L may compute a running estimate over time of the plurality of detected transmission quality estimators such that the favoured frequency band may change from time to time in accordance with the smallest current value of the running estimates of the PERs of the frequency bands. The communication controller 26L of the master hearing aid may be configured to adding a band identifier indicating the favoured or golden frequency band to a predetermined header field of the header section of the data packages generated and transmitted by the master hearing aid. As illustrated on FIG. 2, the section of the header holding or storing the favoured band identifier 207 may comprise 7 bits if 78 frequency bands are utilized, but this header section may naturally comprise fewer bits or more bits if less or more frequency bands are utilized.

FIG. 2 illustrates several exemplary types of data packages 200a, 200b, 200c, 200d with differing data content that are utilized in the present methodology as discussed above. The data package types 200a and 200b belong to the previously discussed first packet category which includes audio data for example audio frames of a real-time digital audio stream as discussed before. The audio data is held in the payload section 211 or portion of the data packages 200a, 200b as discussed before. The data packages 200a, 200b further comprises a header section in front of the payload section and a package error-detecting code 213 (e.g. cyclic redundancy check (CRC) code) after the payload section. These header and CRC sections of the data packages 200a, 200b may be identical to the header and CRC sections of each of the data packages 200c, 200d which both belong to the second packet category without audio data. The header sections of the data packages 200a, 200b, 200c, 200d may comprise an air interface header 201 in a designated field of the data packages. The air interface header may comprise a pre-ample and a unique access address of the portable communication device in question. The previously discussed acknowledgement indicator 203 of the data packages is held in the "ACK" field and may comprise a single bit or several bits. A predetermined code 205 is held in an "L" portion of the header section. The predetermined code 205 is indicating the category of the data package as discussed below in further detail. The field "G-ch" of the header section holds the previously discussed favoured or "golden" band identifier 207. The payload section 211 or portion of the data package 200a holds in addition to the audio data a "Control data" field or section 209. The control data section may hold various types of control data associated with the operation or state of the hearing aid e.g. a command to turn up the volume of the hearing aid, or a switch of audio input channel from e.g. omnidirectional mode to directional mode etc.

The data package type 200c belongs to the previously discussed second packet category. The data structure and individual data fields of the data package 200c are overall identical to the structure of the data package 200a except for the lack of audio data in the payload portion of the data package 200c. The payload section of the data package 200c comprises control data 209 like the payload section of the data package 200a. The data structure and individual data fields of the third type of data package 200d are overall identical to the structure of the data packages 200a, 200b except for the lack of a payload portion. Hence, the size of the third type of data package 200d is smaller than the second type of data package 200c.

The purpose of the predetermined code 205 held in the "L" portion of the header section of each of the first, second, third and fourth data packages 200a, 200b, 200c, 200d is at least indicating a particular category of the data package, e.g. indicating whether the data package belongs to one of the previously discussed first and second packet categories. This feature allows the communication controllers of the left and right hearing aids rapid and efficient processing of a received data package. If the predetermined code L indicates that a particular received data package belongs to the second packet category, the communication controller in question may, after evaluating the code L, for example know that it can skip looking for audio data in the payload section of the received data package. The predetermined code L may indicate, or point to, an address or position of the data package holding a particular type of payload data. Hence, the predetermined code L may for example point to a start address of the control data section 209, or CRC section 213 or a start address of the audio data section 211 of the data package 200a, 200b, 200c, 200d. Three different predetermined numerical values may for example be assigned to the predetermined code L of a particular data package in accordance with its type, i.e. 200a, 200b or 200c, 200d. Hence, a first value X (e.g. 4) of L points to the start address of the CRC section 213. A second value of L such as Y (e.g. 24) points to the start address of the audio data section 211 if there are no control data in the data package. A third value of L (e.g. 26) points to the start address of the control data section 209 provided the data package contains both audio data and two bytes of control data. A fourth value of L such as X+2 (e.g. 6) points to the start address of the control data section 209 provided the data package lacks audio data but includes the two bytes of control data. Hence, the latter scheme for assignment of discrete values to the predetermined code L allows the communication controller to access and identify the type of data content and its location in a particular received data package by reading and evaluating the code L of the received data package. The communication controller may initially determine the packet category of the received data package by reading the L value and notice that L values of Y and X+Y indicates that the data package contains audio data. Hence, if the L value of the received data package in question equals Y or X+Y, the communication controller can determine that the received data package belongs to the first packet category while the residual two values of L indicates the second packet category. The format of the data package where the predetermined code L to points the start address of the control data, audio data or other data content of the data package leads to compact format, i.e. small size of the data package. The compact format is achieved because the data package structure is free from overhead codes or bits in front of each of the individual payload data sections to identify a beginning of each of these data sections. The presence of the predetermined code L in the received data packages also reduces the computation load, and therefore power consumption, of the communication controller at the receiving hearing aid or device. The code L allows the communication controller to jump directly to the start addresses of the various data portions of the received data packages and read the data content thereof instead of parsing or decoding all data bytes of the received data package to find the locations of the desired data portions or fields. The skilled person will understand that other embodiments may lack this predetermined code L and the relevant data content of the data package identified by parsing or evaluating the data package content.

Figure 4:
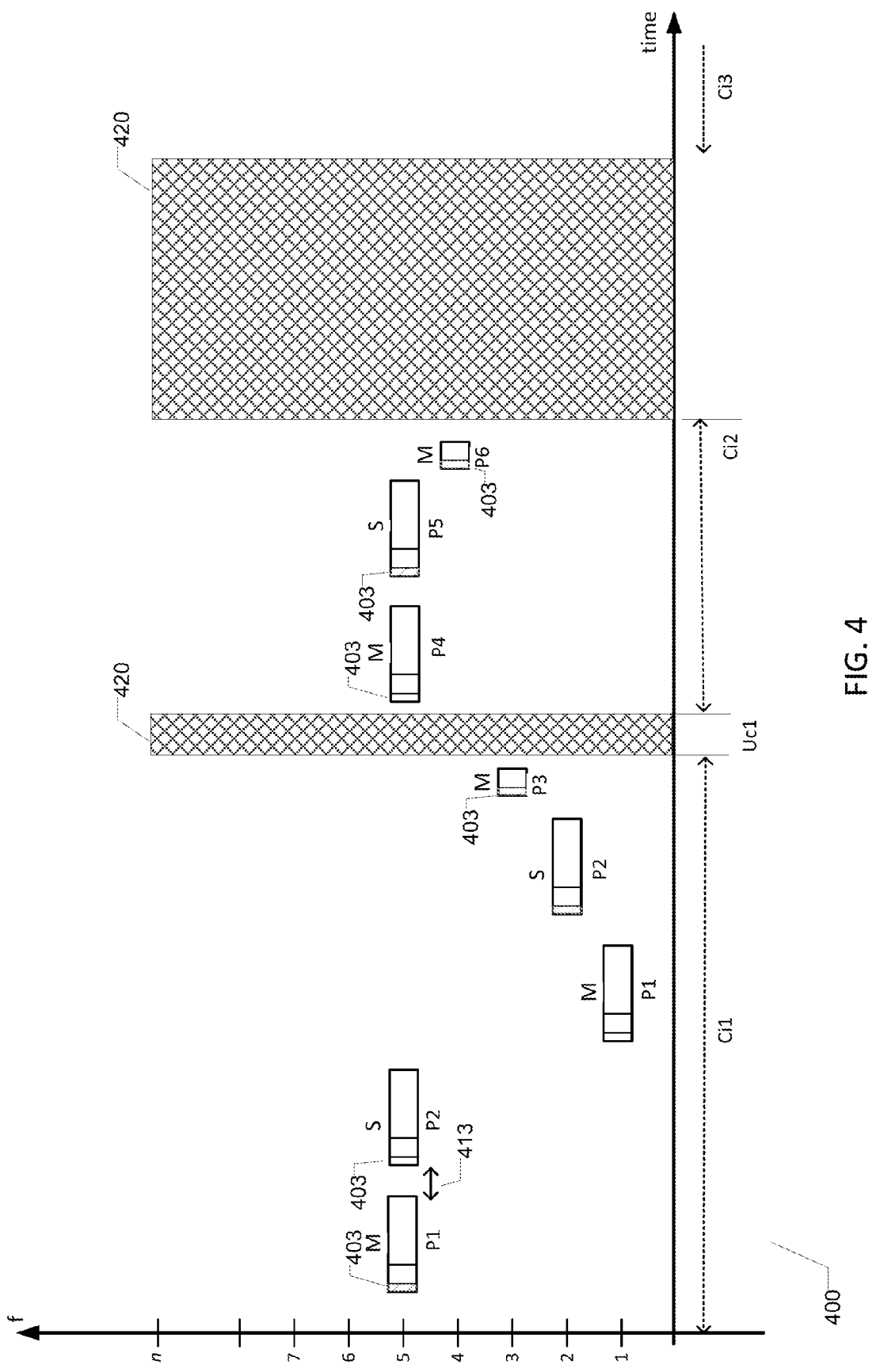
FIG. 4 shows a schematic time-frequency diagram of a second exemplary transmission of data packages between the first and second hearing instruments in accordance with embodiments.

FIG. 4 is a schematic time-frequency diagram or plot 400 of a second exemplary transmission of data packages P1, P2, P3, P4, P5 and P6 of different categories between the left and right hearing aids 10L, 10R in accordance with the previously discussed embodiments. Each of the data packages P1, P2, P4 and P5 belong to the first packet category as discussed before. The data packages P3 and P6 may belong to the second packet category with the features and benefits discussed before. The illustrated second exemplary transmission of data packages will typically correspond to environmental conditions with moderate levels of interfering noise in the utilized frequency band or bands. Hence, the first attempt to transmit P1 may be unsuccessful and/or the first attempt to transmit P2 may be unsuccessful. The utilized data package transmission methodology provides retransmission of a lost data package of the first packet category for a certain maximum number of times, N. The value of N may lie between 1 and 4 as discussed before, but may be larger in alternative embodiments of the data package transmission methodology such as 6, 8 or 10. The illustrated second exemplary transmission of data packages also utilizes the previously discussed favoured frequency band embodiment such that the first attempt to transmit P1 and P2 in the first connection event Ci1 is made on the favoured frequency band No. 5. Likewise, the first attempt to transmit P4 and P5 in the second connection event Ci2 is made on the favoured frequency band and so forth for the first attempt to transmit a particular data package in the following successive connection events Ci3, Ci4 etc.

The transmission of data packages illustrated on the schematic time-frequency diagram 400 begins once the left (M) and right (S) hearing aids 10L, 10R have been connected following the previously discussed methodology. The communication controller 26L generates the first data package P1 with an unset acknowledgement indicator 403 for the reasons discussed above. P1 is then transmitted to the right hearing aid as outlined before. In the right or slave hearing aid 10R, the communication controller 26R is configured to monitoring the wireless communication channel 12 (refer to FIG. 1) for receipt of the first data package P1 at a particular time window as discussed above. If and once P1 is received at the right hearing aid 10R, the communication controller 26R checks whether the data content of P1 is corrupted or not based on the error-detecting code held in the CRC section of P1. In contrast to the previous first transmission example, the communication controller 26R now finds a failed CRC check or that P1 is absent at the expected time window. Hence, the communication controller 26R concludes that the first attempt to transmit P1 from the right hearing aid was unsuccessful or a failure because P1 was either not received at the left hearing aid 10L or P1 had corrupted data. The communication controller 26R responds to this finding by generating the data content of the new P2 data package in accordance with the data package layout 200a (refer to FIG. 2) for a data package of the first category. The communication controller 26R leaves the acknowledgement indicator 403 of P2 unset and transmits P2 to the left hearing aid through the bi-directional wireless communication channel on the favoured frequency band No. 5 since it is the first attempt to transmit P2. In left hearing aid, the communication controller 26L monitors the favoured frequency band No. 5 awaiting receipt of P2. If and once P2 is received at the left hearing aid 10L, the communication controller 26L checks whether the data content of P2 is corrupted or not based on the error-detecting code of the CRC section of P2. In contrast to the previous first transmission example, the communication controller 26L finds this time that the CRC check of P2 is valid but the acknowledgement indicator of P2 is unset. Consequently, the communication controller 26L concludes that the transmission of the previous data package P1 failed. Since, P1 belongs to the first packet category, and only a single transmission attempt has so far been made, the communication controller 26L responds by retransmitting P1 a first time, i.e. performing a second transmission of P1.

In connection with making the decision as to whether or not to retransmit P1, the communication controller 26L may be configured to make an initial detection of the category of P1 by inspection or evaluation of the value of the previously discussed L code held in the predetermined header field 205 of P1. This is a very efficient way to determine the packet category of P1. If P1 belongs to the first packet category, the communication controller 26L is configured to retransmit P1 a limited number of times during the current connection event, e.g. Ci1, until either a valid data package with a set acknowledgement indicator is received from the right hearing aid or the previously discussed maximum number N of retransmissions P1 is reached. P1 is skipped or flushed once the maximum number of retransmissions N of P1 is reached by the communication controller 26L. Hence, P1 is flushed after N failed retransmissions of P1 or in other words a total of N+1 unsuccessful attempts to transmit P1. If P1 on the other hands belongs to the second packet category, the communication controller 26L may discard or skip any further attempts to retransmit P1 in the current connection event immediately after a failed first attempt because the data content of P1 is can be assumed to lack urgency, i.e. not real-time critical as the case for category 1 data packages with real-time audio data. The communication controller 26L may detect the category of P1 by inspection of the predetermined value of the code L as discussed above. To ensure the data content of P1 is not lost if P1 belongs to the second packet category P1 is preferably retransmitted in the subsequent connection event to Ci1, e.g. Ci2, in the present example. This process will lower the power consumption of the left and right hearing aids because the skipped retransmission of P1 under these circumstances allows quick powering down of the radio transceiver 34L and the radio transceiver 34R and entry into the idle time period 420. The non-time critical data content of P1 may instead be added to the control data section of the first data packet transmitted in the second connection event, i.e. P4 in this transmission example.

Reverting to the situation or example where P1 belongs to the first packet category, the communication controller 26L is preferably configured to retransmit P1 a first time on a default frequency band that is different from the favoured frequency band (No. 5 in this example) since the latter may be corrupted by interfering noise as indicated by the failure to transmit P1 at the first attempt on the favour frequency band. The communication controller 26L has in the present example selected frequency band No. 1 as the new and different frequency band e.g. as set by the previously discussed connection parameters to ensure synchronization between left and right hearing aids. The skilled person will understand that other frequency bands of the n spaced apart frequency bands could be selected as the default frequency band for the first retransmission. Data packages transmitted subsequent to the first retransmission of P1 on the new default frequency band No. 1 may be transmitted on frequency bands selected in accordance with the previously discussed predetermined frequency hopping key or scheme as illustrated by selection of frequency band No. 2 for the first retransmission of P2 and frequency band No. 3 for the first transmission of P3. In other words, if the first transmission attempt of the first and/or second data package on the favoured frequency band fails, the transmission scheme for transmission of any further data packages during a current connection event may revert to a traditional frequency hopping scheme based on the current hopping key, e.g. the scheme discussed above. In the right hearing aid 10R, the communication controller 26R is now configured to monitoring the bi-directional wireless communication channel for receipt of the retransmitted P1 package at a particular time window as discussed above. If and once the retransmitted P1 is received at the right hearing aid 10R, the communication controller 26R checks, as outlined above, the data content of the retransmitted P1 inclusive the setting of the acknowledgement indicator. In this example the retransmission of P1 is successful and the communication controller 26R detects the unset state of the acknowledgement indicator of P1. The unset state of the acknowledgement indicator of P1 indicates a failure of the first attempt to transmit P2 from the right hearing aid to the left hearing aid. Furthermore, P2 must be retransmitted because it belongs to the first packet category for the reasons discussed above with respect to P1. Hence, the communication controller 26R retrieves or regenerates P2, sets the acknowledgment indicator of the header of P2 and retransmits P2 for a first time to the left hearing aid. The communication controller 26R also selects a new frequency band, band No. 2, for the retransmission of P2 by applying the current hopping key, one, to the previous frequency band. On other hand, had the first retransmission of P1 been a failure, communication controller 26R of the right hearing aid would had retrieved or regenerated P2 with an unset acknowledgment indicator and then retransmitted P2 to the left hearing aid.

If and once the first retransmission of P2 is received at the left hearing aid 10L, the communication controller 26L checks once again the data content of the received P2 package. In contrast to the first attempt to transmit P2, the communication controller 26L finds this time that the CRC of P2 is valid and the acknowledgement indicator of P2 is set. Consequently, the communication controller 26L concludes that the first retransmission of P1 was successful. Hence, no further retransmissions of Pb are required as the audio data of P1 has now been safely received at the left hearing aid. Furthermore, since P2 was correctly received at the left hearing aid, the communication controller 26L of the left hearing aid generates and transmits a new, short, data package P3 with a set acknowledgement indicator. P3 belongs to the second packet category as discussed before. The communication controller 26L may in response switch the radio transceiver 34L into the previously discussed idle mode for the residual duration of Ci1 to lower the power consumption of the left hearing aid.

On the other hand, had the CRC check of the retransmitted P2 been invalid or had P2 been absent at the expected time, the communication controller 26L had concluded that the first retransmission of P1 was a failure too and carried out the earlier outlined steps to retransmit P1 for a second time provided the maximum number of retransmissions, N, had not been exceeded. Hence, if the value of N had been set to 1, then the communication controller 26L would not attempt to retransmit P1 for the second time, but instead flush or abandon P1 for the reasons discussed before in view of the potential latency problems involved with too many retransmission of the same data package with real-time audio data. In the latter scenario, the first data package P4 transmitted by the left hearing aid in the second connection event Ci2 would accordingly hold new and updated audio data in the payload section relative to the flushed audio data of P1.

The skilled person will appreciate that the data of first data package P1 in the first transmission attempt and the data of the first data package in the one or more possible retransmissions of P1 need not be exactly identical, since the setting of the acknowledgement indicator and/or CRC value may have changed between the first transmission of P1 and a subsequent retransmission of P1. The acknowledgement indicator of the retransmitted P1 package may reflect the actual receipt failure or receipt success of the second data package P2 while the acknowledgement indicator of P1 in the first transmission attempt may have the previously discussed default setting or value. However, at least the payload section of the first data package P1 is preferably identical between the first transmission attempt and the one or more retransmissions. The same applies for the second and third data packages P2 and P3 and so on.

Once the communication controller 26R of the right hearing aid receives the earlier transmitted package P3 and detects a set acknowledgement indicator therein, the communication controller 26R concludes that the first retransmission of P2 was successful. The communication controller 26R may in response put the radio transceiver 34R into the previously discussed idle mode to lower the power consumption of the right hearing aid. On the hand, had the CRC check of P3 been invalid, or had P3 been absent at the expected time, the communication controller 26R had concluded that the first retransmission of P2 was a failure too (i.e. like the first transmission attempt of P2). The communication controller 26R would then start to retransmit P2 until a data package with acknowledgement is received or until the maximum number of retransmissions N had been reached. However, as the radio transceiver 34L of the left hearing aid has already entered the idle mode, the left hearing aid will not transmit any further data packages which in response leads the communication controller 26R of the right hearing aid to retransmit P2 until the maximum number of retransmissions N is reached. Hence, the lack of an express acknowledgement of receipt indicator from the left hearing aid in respect of P2 may lead the right hearing aid to believe the transmission of P2 was a failure even though P2 was actually correctly received at the left hearing aid at the first retransmission. However, this situation is unproblematic for the operation of the present transmission methodology or protocol, because the communication controller 26R of the right hearing aid simply proceeds to flush P2 after the N failed retransmissions of P2. In the next connection event Ci2, the communication controller 26R generates new data package P5 with a payload section that comprises updated audio data relative to the audio data of P2 for the right hearing aid as discussed before.

Figure 5:
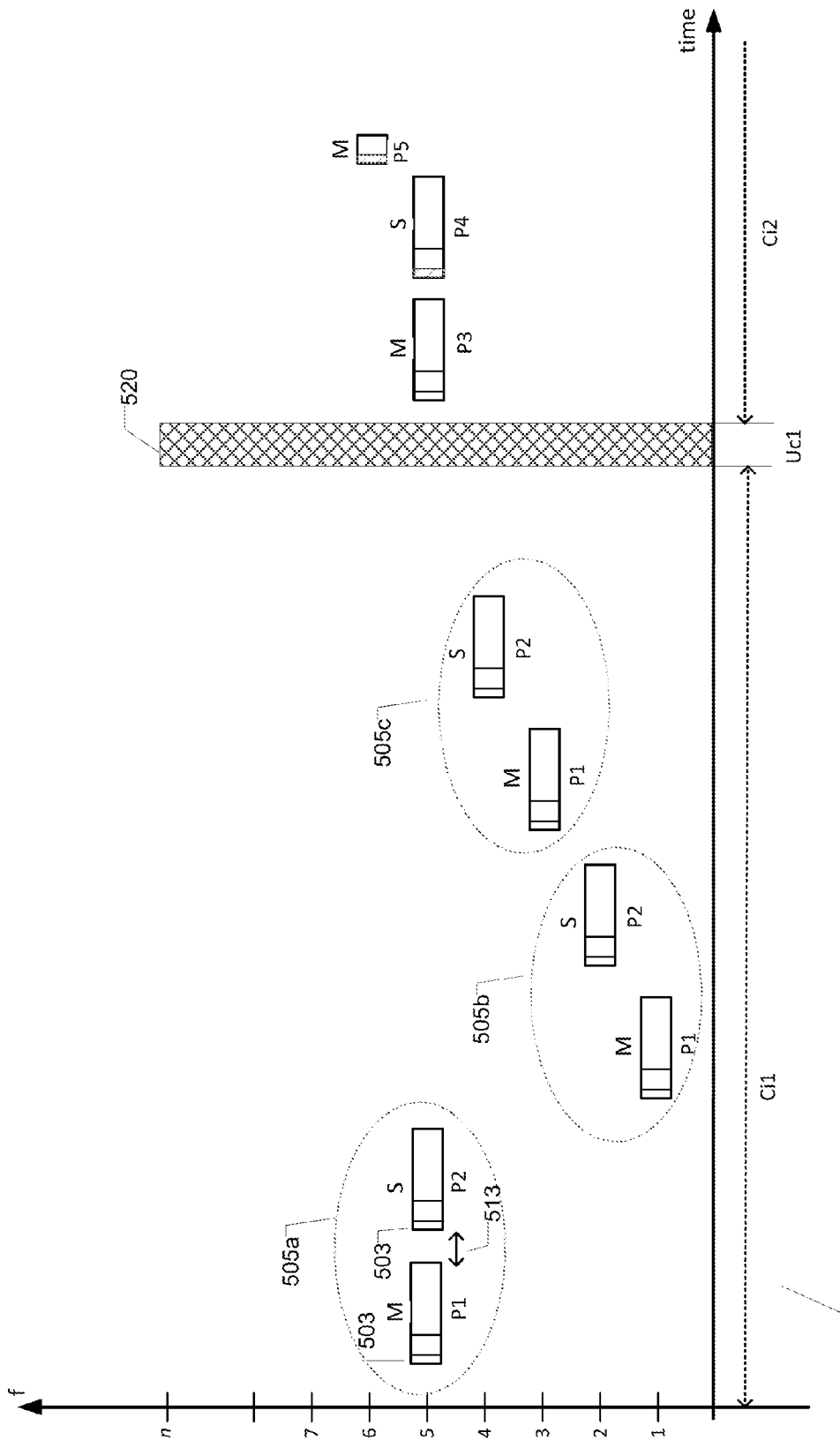
FIG. 5 shows a schematic time-frequency diagram of a third exemplary transmission of data packages of different categories between the first and second hearing instruments in accordance with embodiments.

FIG. 5 is a schematic time-frequency diagram or plot 500 of a third exemplary transmission of data packages P1, P2, P3, P4 and P5 of different categories between the left and right hearing aids 10L, 10R in accordance with the previously discussed embodiments. Each of the data packages P1, P2, P3 and P4 belong to the first packet category as discussed before. The data package P5 may belong to the second packet category with the accompanying features and benefits discussed above. The illustrated third exemplary transmission of data packages will typically correspond to environmental conditions dominated by high levels of interfering noise in the utilized frequency band or bands during the first connection event Ci1. The environmental conditions may have improved during the second connection event Ci2. Hence, the first attempt to transmit P1 may be unsuccessful and/or the first attempt to transmit P2 may be unsuccessful. The subsequent attempts to retransmit P1 and to retransmit P2 during the first connection event Ci1 may all fail as well. The maximum number of retransmissions N of a lost data package of the first packet category, i.e. P1 or P2 in the present example, has been set to two, i.e. N=2 for both of the left and right hearing aids 10L, 10R in this example but may differ in other embodiments. The illustrated third exemplary transmission of data packages also utilizes the previously discussed favoured frequency band methodology for the first attempt to transmit a data package in each connection event. The transmission of data packages illustrated on the schematic time-frequency diagram 500 begins once the left (M) and right (S) hearing aids 10L, 10R have been connected following the previously discussed methodology. The communication controller 26L generates the first data package P1 with an unset acknowledgement indicator 503 as discussed before and transmits P1 to the right hearing aid as outlined before. In the right and left hearing aids, the respective communication controllers 26R, 26L are configured to monitoring the wireless communication channel 12 (refer to FIG. 1) for receipt of the first data and second packages P1, P2 at particular time windows as discussed above. In the present example, both the first attempt to transmit P1 on the favoured frequency band No. 5 fails and the first attempt to transmit P2 on the favoured frequency band No. 5 fails, as indicated by package exchange session 505a, for one of the reasons discussed above. The communication controller 26R of the right hearing aid 10R in response retransmits P1, still with the unset acknowledgement indicator 503, a first time on the default frequency band No. 1 as discussed in connection with the second exemplary data package transmission. The communication controller 26L of the left hearing aid retransmits P2, with an unset acknowledgement indicator 503, a first time on the frequency band No. 1 as indicated by the hopping key as discussed in connection with the second exemplary data package transmission. However, both the first retransmission of P1 fails and the first retransmission of P2 fails as indicated inside package exchange session 505b despite the switching to new frequency bands compared to the favoured frequency band. The communication controllers 26L, 26R of the left and right hearing aids therefore proceed to make a second retransmission attempt of their respective data packages, P1 and P2, as indicated inside package exchange session 505c. When the communication controller 26L of the left hearing aid detects that the acknowledgement indicator 503 of P2 in the package exchange session 505c is (still) unset, or that P2 is absent, the communication controller 26L compares the current number of retransmissions of P1 with the maximum number of retransmissions N which is set to two. The communication controller 26L therefore concludes that the maximum number of retransmissions P1 has been reached and proceeds to flush or skip P1 rather than attempting yet another retransmission of P1 for the reasons discussed before. The communication controller 26L may therefore proceed by switching to the previously discussed quick power-down mode of the radio transceiver 34L in expectation of the upcoming idle time period 520. Hence, the communication controller 26L may in this situation interrupt the monitoring of the wireless communication channel for incoming data packages, because P1 should not be retransmitted regardless of the actual setting of the acknowledgement indicator 503 of P2 in the package exchange session 505c. The communication controller 26R of the right hearing aid proceeds in a corresponding manner once it detects that the acknowledgement indicator of P1 in the package exchange session 505c is unset, or that P2 is absent, the communication controller 26L.

Figure 6:
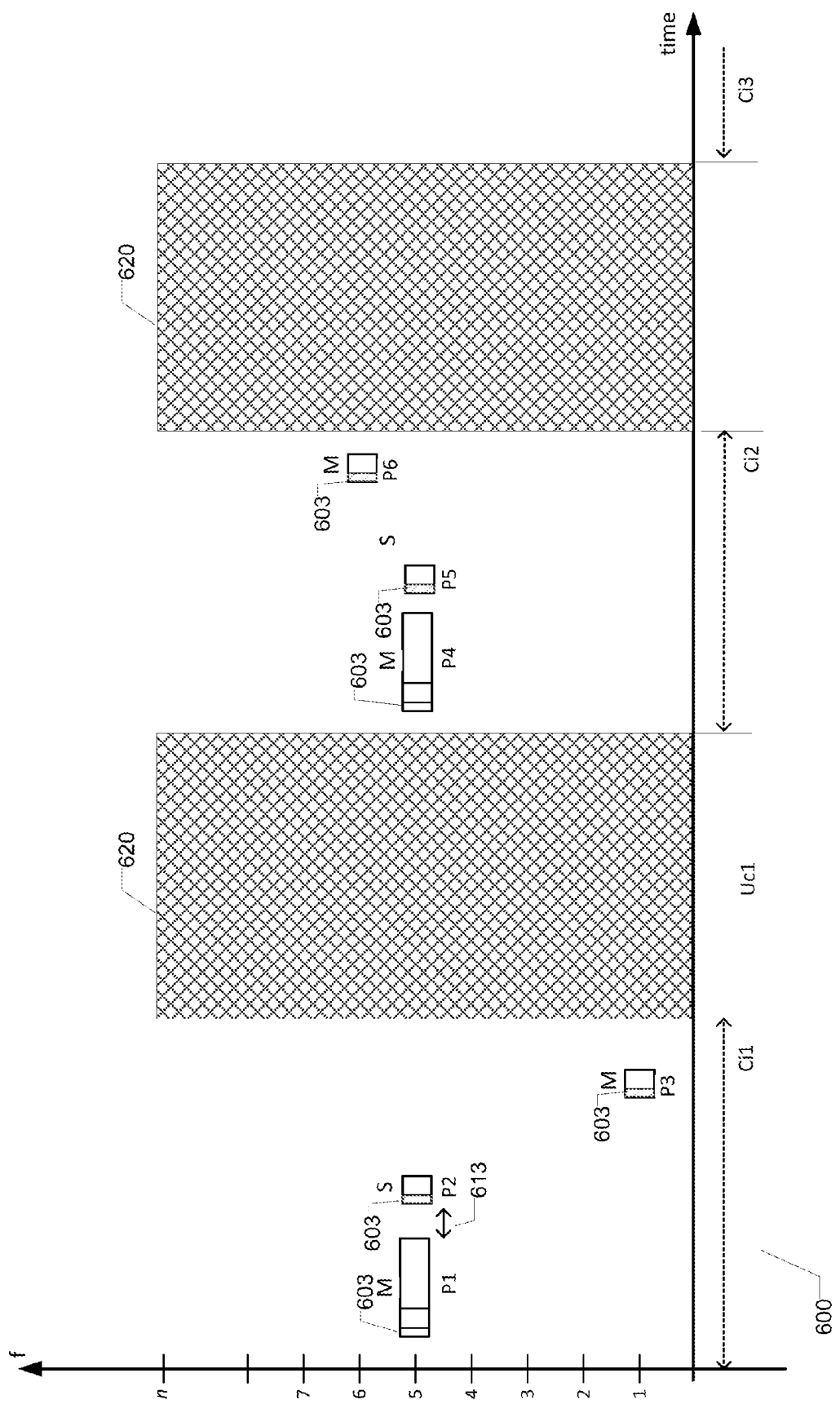
FIG. 6 shows a schematic time-frequency diagram of a fourth exemplary transmission of data packages of different categories between the first and second hearing instruments in accordance with embodiments.

FIG. 6 is a schematic time-frequency diagram or plot 600 of a fourth exemplary transmission of data packages P1, P2, P3, P4, P5 and P6 of different categories between the left and right hearing aids 10L, 10R in accordance another embodiment. In the present embodiment, the second hearing aid generates and transmits only data packages of the second packet category while the first hearing aid generates and transmits at least some audio data packages of the first packet category. Hence, an audio stream may be transmitted from first to the second hearing aid but not vice versa. As illustrated, P1 and P4 belong to the first packet category while the data packages P2 and P5 transmitted by the second hearing aid belong to the second packet category. The illustrated third exemplary transmission of data packages will typically correspond to environmental conditions with low levels of interfering noise in the utilized frequency band or bands during the first and second connection events Ci1 and Ci2. Hence, the first attempt to transmit P1 is successful and the first attempt to transmit P2 is likewise successful. Hence, the first hearing aid generates the third data package P3 with a set acknowledgement indicator and transmits P3 to the second hearing aid. The latter receives and checks the content of P3 and finds that the acknowledgement indicator of P3 is set and the data of P3 are valid as for example indicated by the CRC code of P3. Hence the first connection event Ci1 is now terminated by the first and second hearing aids. Since the present embodiment utilises the golden frequency band procedure, the first attempt to transmit the first data package P4 of the subsequent connection event Ci2 is carried out on frequency band No. 5 and the second hearing aid responds to receipt successful receipt of P4 by generating and transmitting P5 which in turn is responded to by the first hearing aid by generating and transmitting the data package P6 of the second packet category since the P4, with its audio data, has been successfully received at the second hearing aid.

FIG. 7 shows the previously discussed schematic time-frequency diagram or plot 700 of the transmission of data packages P1, P2, P3, P4 and P5 where the hopping key is set to 1 and no favoured/golden frequency band scheme is utilized. The data packages P1 and P2, P3 and P4 all belong to the first packet category. The maximum number of retransmissions of the first and second data packages, N, M, respectively, is both set to 2. The illustrated exemplary transmission of data packages will typically correspond to environmental conditions dominated by high levels of interfering noise in the utilized frequency band or bands during the first connection event Ci1 and much smaller levels of interfering noise in the utilized frequency band or bands during the second connection event Ci2. As indicated by the unset acknowledgement indicators of all transmitted P2 data packages, both the first transmission attempt and the two subsequent retransmission attempts of the first data package P1 failed. Likewise, both the first transmission attempt and the two subsequent retransmission attempts of the second data package P2 failed. Consequently, the communication controller 26L of the left hearing aid proceeds to flush P1 and the communication controller 26R of the right hearing aid proceeds to flush P2. Hence, there is not transmitted any third data package during Ci1. During the second connection event Ci2, the communication controller 26L generates the new data package P3 and adds current audio data such as an audio frame to the payload section of P3. The communication controller 26L sets the previously discussed default value of the acknowledgement indicator 703 of P3 and writes other data package sections with appropriate data and finally transmits P3 to the right hearing aid. The communication controller 26R of the right hearing aid monitors frequency band No. 7 of the wireless communication channel and awaits arrival of P3. Upon receipt of P3, the communication controller 26R proceeds as discussed in detail before with reference to FIG. 4 in case of a successful receipt of a data package of the first category. Hence, data packages P3, P4 and P5 can be viewed as a first, second and third data package, respectively, of the second connection event Ci2.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A method of exchanging data packages between a first portable communication device and a second portable communication device over a bi-directional wireless communication channel, where at least one of the first and second portable communication devices comprises a hearing instrument, the method comprising:
    generating, by the first portable communication device, a first data package belonging to a first packet category comprising audio data or to a second packet category without audio data;
    adding an acknowledgement indicator with a default setting to the first data package;
    transmitting the first data package from the first portable communication device to the second portable communication device through the wireless communication channel;
    if the first portable communication device receives a second data package, and if an acknowledgement indicator in the second data package is set:
        generating, at the first portable communication device, a third data package comprising an acknowledgment indicator setting reflecting successful or failed receipt of the second data package; and
        transmitting the third data package to the second portable communication device through the wireless communication channel; and
    if the acknowledgement indicator in the second data package is unset, or if the first portable communication device fails to receive the second data package:
        setting the acknowledgment indicator in the first data package to reflect failed receipt of the second data package; and
        retransmitting the first data package from the first portable communication device to the second portable communication device, wherein the retransmission of the first data package is carried out for at the most N times if the first data package belongs to the first packet category, N being a positive integer between 1 and 4.

2. The method of exchanging data packages according to claim 1, further comprising:
    checking an error-detection code of the second data package subsequent to receipt of the second data package at the first portable communication device; and
    if the error-detection code indicates invalid data of the second data package, ignoring the acknowledgment indicator of the second data package, and unsetting an acknowledgment indicator of the third data package to reflect failed receipt of the second data package.

3. The method of exchanging data packages according to claim 1, further comprising:
    receiving the first data package at the second portable communication device;
    generating, by the second portable communication device, the second data package with the acknowledgment indicator setting reflecting successful or failed receipt of the first data package;
    transmitting the second data package from the second portable communication device to the first portable communication device through the bi-directional wireless communication channel;
    receiving the first data package or the third data package at the second portable communication device;
    if the acknowledgement indicator of the first or third data package is set:
    discarding retransmission of the second data package; and
    if the acknowledgement indicator of the first or the third data package is unset:
    retransmitting the second data package from the second portable communication device to the first portable communication device for at most M times if the second data package belongs to the first packet category, M being a positive integer number between 1 and 4.

4. The method of exchanging data packages according to claim 1, further comprising:
    establishing a plurality of successive connection events through the wireless communication channel;
    wherein the first data package is transmitted during at least one connection event of the plurality of successive connection events.

5. The method of exchanging data packages according to claim 4, further comprising:
    retransmitting the first data package for at most N times during the at least one connection event if the first data package belongs to the first packet category; and/or
    retransmitting the second data package for at most M times during the at least one connection event if the second data package belongs to the first packet category.

6. The method of exchanging data packages according to claim 4, wherein the plurality of consecutive connection events are separated by disconnect time periods or idle time periods without data package exchange between the first portable communication device and the second portable communication device.

7. The method of exchanging data packages according to claim 6, further comprising powering down respective transceiver circuits of the first portable communication device and the second portable communication device during the disconnect time periods.

8. The method of exchanging data packages according to claim 1, wherein if the first portable communication device fails to receive the second data package or if the acknowledgement indicator of the second data package is unset, the method further comprises flushing or abandoning the first data package if the first data package belongs to the second packet category.

9. The method of exchanging data packages according to claim 1, further comprising:
  if the acknowledgement indicator of the second data package is unset, or if the first portable communication device fails to receive the second data package:
    discarding retransmission of the first data package in a current connection event if the first data package belongs to the second packet category; and
    adding a section of data of the first data package to a subsequent data package for transmission during a subsequent connection event.

10. The method of exchanging data packages according to claim 1, further comprising:
  if the transmission and N retransmissions of the first data package fails:
    flushing the first data package;
    generating a fourth data package of the first packet category; and
    transmitting the fourth data package from the first portable communication device to the second portable communication device through the wireless communication channel.

11. The method of exchanging data packages according to claim 1, further comprising:
  if the transmission and M retransmissions of the second data package fails, and if the second data package belongs to the first packet category:
    flushing the second data package;
    generating a fourth data package of the first packet category; and
    transmitting the fourth data package from the second portable communication device to the first portable communication device through the wireless communication channel.

12. The method of exchanging data packages according to claim 1, wherein a data package of the first packet category has a greater size than a data package of the second packet category.

13. The method of exchanging data packages according to claim 12, wherein the data package of the first packet category comprises at least a header section, a payload section holding the audio data, and a data check section holding a package error-detection; and
wherein the data package of the second packet category comprises at least a header section and a data check section holding a package error-detection or error-correction code.

14. The method of exchanging data packages according to claim 1, wherein the third data package belongs to the second packet category.

15. The method of exchanging data packages according to claim 1, wherein a header section the first data package comprises a predetermined code or value (L) indicating a category of the first data package.

16. A wireless binaural hearing aid system configured to exchange data packages over a bi-directional wireless communication channel, the hearing aid system comprising:
  a first hearing instrument comprising a first radio transceiver, and a first communication controller coupled to the first radio transceiver; and
  a second hearing instrument comprising a second radio transceiver, and a second communication controller coupled to the second radio transceiver;
  wherein the first communication controller is configured for:
    generating a first data package belonging to a first packet category comprising audio data or to a second packet category without audio data;
    adding an acknowledgement indicator with a default setting to the first data package; and
    transmitting the first data package to the second hearing instrument through the wireless communication channel;
    if the first portable communication device receives a second data package and if an acknowledgement indicator in the second data package is set:
      generating a third data package comprising an acknowledgment indicator setting reflecting successful or failed receipt of the second data package, and
      transmitting the third data package to the second hearing instrument through the wireless communication channel; and
    if the acknowledgement indicator in the second data package is unset, or if the first hearing instrument fails to receive the second data package:
      setting the acknowledgment indicator in the first data package to reflect failed receipt of the second data package; and
      retransmitting the first data package to the second hearing instrument, wherein the retransmission of the first data package is carried out for at most N times if the first data package belongs to the first packet category, N being a positive integer between 1 and 4.

* * * * *